US 11,156,261 B2

(12) United States Patent
Deferme

(10) Patent No.: US 11,156,261 B2
(45) Date of Patent: Oct. 26, 2021

(54) DAMPER WITH MULTIPLE EXTERNAL CONTROL VALVES

(71) Applicant: Tenneco Automotive Operating Company Inc., Lake Forest, IL (US)

(72) Inventor: Stefan Deferme, Heusden-Zolder (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 28 days.

(21) Appl. No.: 16/234,725

(22) Filed: Dec. 28, 2018

(65) Prior Publication Data
US 2020/0208704 A1 Jul. 2, 2020

(51) Int. Cl.
F16F 9/06 (2006.01)
F16F 9/36 (2006.01)
(Continued)

(52) U.S. Cl.
CPC ............. F16F 9/062 (2013.01); B60G 13/08 (2013.01); F16F 9/065 (2013.01); F16F 9/185 (2013.01);
(Continued)

(58) Field of Classification Search
CPC .. F16F 9/062; F16F 9/185; F16F 9/348; F16F 9/065; F16F 9/366; F16F 9/3214;
(Continued)

(56) References Cited

U.S. PATENT DOCUMENTS 3,661,236 A 5/1972 Wossner
4,802,561 A 2/1989 Knecht et al.
(Continued)

FOREIGN PATENT DOCUMENTS

CN 204083040 U 1/2015
DE 4022099 C1 12/1991
(Continued)

OTHER PUBLICATIONS

International Search Report regarding PCT/US2020/041887, dated Oct. 30, 2020.
(Continued)

Primary Examiner — Melody M Burch
(74) Attorney, Agent, or Firm — Harness, Dickey & Pierce, P.L.C.

(57) ABSTRACT

A damper with inner and outer tubes and a piston slidably disposed within the inner tube to define first and second working chambers. A fluid transport chamber is positioned between the inner and outer tubes and a collector chamber is positioned outside the outer tube. First and second external control valves are positioned in fluid communication with the collector chamber. An intake valve assembly, abutting one end of the inner tube, includes first and second intake valve bodies with intake passages and intake valves. A first intermediate chamber is positioned between the first and second intake valve bodies and an accumulation chamber is positioned between the second intake valve body and a closed end of the outer tube. The fluid transport chamber, first intermediate chamber, and accumulation chamber are arranged in fluid communication with the collector chamber. The intake valves control fluid flow between the accumulation chamber and second working chamber.

20 Claims, 14 Drawing Sheets

(51) Int. Cl.
  *F16F 9/18* (2006.01)
  *F16F 9/348* (2006.01)
  *B60G 13/08* (2006.01)
  B60G 17/015 (2006.01)
  B60G 17/08 (2006.01)

(52) U.S. Cl.
  CPC .......... *F16F 9/348* (2013.01); *F16F 9/366* (2013.01); *B60G 17/0152* (2013.01); *B60G 17/08* (2013.01); *B60G 2202/24* (2013.01); *B60G 2206/41* (2013.01); *B60G 2500/10* (2013.01); *B60G 2800/162* (2013.01); *F16F 2222/12* (2013.01); *F16F 2228/066* (2013.01)

(58) Field of Classification Search
  CPC ............ F16F 2222/12; F16F 2228/066; B60G 17/0152; B60G 13/08; B60G 2202/24; B60G 2206/41; B60G 2800/162
  See application file for complete search history.

(56) References Cited

U.S. PATENT DOCUMENTS

| | | | |
|---|---|---|---|
| 4,960,188 A | 10/1990 | Wossner | |
| 5,010,916 A * | 4/1991 | Albrecht | F16K 15/028 137/454.2 |
| 5,163,538 A | 11/1992 | Derr et al. | |
| 5,178,240 A | 1/1993 | Houghton | |
| 5,195,619 A | 3/1993 | Dourson et al. | |
| 5,301,412 A | 4/1994 | Hahn et al. | |
| 5,335,757 A | 8/1994 | Knecht et al. | |
| 5,375,683 A | 12/1994 | Huang et al. | |
| 5,431,259 A | 7/1995 | Mizutani et al. | |
| 5,540,309 A | 7/1996 | Huang et al. | |
| 5,558,189 A | 9/1996 | Beck | |
| 5,586,627 A | 12/1996 | Nezu et al. | |
| 5,588,510 A | 12/1996 | Wilke | |
| 5,603,392 A | 2/1997 | Beck | |
| 5,607,035 A | 3/1997 | Fulks et al. | |
| 5,620,172 A | 4/1997 | Fulks et al. | |
| 5,649,611 A | 7/1997 | Nakadate | |
| 5,788,030 A | 8/1998 | Rottenberger | |
| 5,860,498 A | 1/1999 | Pradel | |
| 5,901,820 A | 5/1999 | Kashiwagi et al. | |
| 5,934,422 A | 8/1999 | Steed | |
| 6,116,584 A | 9/2000 | Romer | |
| 6,129,368 A | 10/2000 | Ishikawa | |
| 6,283,259 B1 | 9/2001 | Nakadate | |
| 6,321,888 B1 | 11/2001 | Reybrouck et al. | |
| 6,419,057 B1 | 7/2002 | Oliver et al. | |
| 6,427,986 B1 * | 8/2002 | Sakai | B60G 15/14 188/266.6 |
| 6,494,441 B2 | 12/2002 | Beck et al. | |
| 6,527,093 B2 | 3/2003 | Oliver et al. | |
| 6,978,871 B2 | 12/2005 | Holiviers | |
| 7,374,028 B2 | 5/2008 | Fox | |
| 7,438,164 B2 | 10/2008 | Groves et al. | |
| 7,950,506 B2 | 5/2011 | Nowaczyk | |
| 8,146,897 B2 | 4/2012 | Beck | |
| 8,157,276 B2 | 4/2012 | Noda et al. | |
| 8,495,947 B2 | 7/2013 | Hata | |
| 8,511,447 B2 | 8/2013 | Nowaczyk et al. | |
| 8,776,961 B2 | 7/2014 | Mori et al. | |
| 8,798,859 B2 | 8/2014 | Uchino et al. | |
| 8,898,899 B2 | 12/2014 | Kim | |
| 8,965,632 B2 | 2/2015 | Uchino et al. | |
| 9,062,737 B2 | 6/2015 | Hoult | |
| 9,067,636 B2 | 6/2015 | Murakami | |
| 9,080,631 B2 | 7/2015 | Hoult | |
| 9,169,888 B2 | 10/2015 | Nishimura et al. | |
| 9,206,876 B2 | 12/2015 | Yamashita et al. | |
| 9,309,948 B2 | 4/2016 | Katayama et al. | |
| 9,347,511 B2 | 5/2016 | Kim | |
| 9,428,030 B2 | 8/2016 | Teraoka et al. | |
| 9,662,952 B2 | 5/2017 | Funke et al. | |
| 10,473,179 B2 | 11/2019 | Ripa | |
| 10,539,202 B2 | 1/2020 | Jee | |
| 10,570,982 B2 | 2/2020 | Zhu | |
| 2004/0262107 A1 | 12/2004 | Nandyal | |
| 2005/0023093 A1 | 2/2005 | Leiphart et al. | |
| 2005/0121268 A1 | 6/2005 | Groves et al. | |
| 2006/0054435 A1 | 3/2006 | Yamaguchi | |
| 2007/0000743 A1 * | 1/2007 | Naitou | B60G 15/12 188/322.2 |
| 2009/0242339 A1 | 10/2009 | Nakadate et al. | |
| 2010/0065765 A1 | 3/2010 | Forche et al. | |
| 2010/0326780 A1 | 12/2010 | Murakami | |
| 2011/0042174 A1 | 2/2011 | Hamers et al. | |
| 2013/0081913 A1 * | 4/2013 | Nowaczyk | B23K 11/14 188/315 |
| 2013/0275003 A1 | 10/2013 | Uchino et al. | |
| 2014/0090938 A1 * | 4/2014 | Nishimura | F16F 9/3235 188/269 |
| 2014/0231200 A1 * | 8/2014 | Katayama | F16F 9/325 188/314 |
| 2014/0291089 A1 | 10/2014 | Konakai et al. | |
| 2015/0047937 A1 * | 2/2015 | Kim | F16F 9/461 188/322.13 |
| 2015/0191069 A1 | 7/2015 | Zuleger et al. | |
| 2016/0160955 A1 | 6/2016 | Yu et al. | |
| 2016/0214453 A1 | 7/2016 | Tanahashi et al. | |
| 2016/0229254 A1 | 8/2016 | Teraoka et al. | |
| 2016/0230832 A1 | 8/2016 | Hagidaira | |
| 2016/0281815 A1 | 9/2016 | Teraoka et al. | |
| 2017/0284497 A1 | 10/2017 | Uotani et al. | |
| 2017/0334503 A1 | 11/2017 | Sintorn et al. | |
| 2018/0031071 A1 | 2/2018 | Marking | |
| 2018/0135720 A1 | 5/2018 | De Kock | |
| 2018/0266510 A1 | 9/2018 | Jee | |
| 2018/0320751 A1 | 11/2018 | Kadokura et al. | |
| 2018/0355939 A1 | 12/2018 | Zeissner et al. | |
| 2019/0136932 A1 * | 5/2019 | Deferme | F16F 9/185 |
| 2019/0309816 A1 | 10/2019 | Shibata et al. | |
| 2020/0124129 A1 | 4/2020 | Mohammadi | |
| 2020/0208704 A1 | 7/2020 | Deferme | |
| 2020/0208705 A1 | 7/2020 | Deferme | |
| 2021/0003190 A1 * | 1/2021 | Deferme | F16F 9/463 |

FOREIGN PATENT DOCUMENTS

| | | |
|---|---|---|
| DE | 19527849 C1 | 8/1996 |
| DE | 4423515 C2 | 7/1998 |
| DE | 4324444 C2 | 11/2000 |
| DE | 10355151 A1 | 6/2005 |
| DE | 102006014463 A1 | 8/2007 |
| DE | 102010020057 A1 | 1/2011 |
| DE | 102015209179 A1 | 11/2016 |
| DE | 102015224811 A1 | 6/2017 |
| DE | 102016206595 A1 | 10/2017 |
| EP | 0635655 A1 | 1/1995 |
| EP | 1508723 A2 | 2/2005 |
| EP | 1862337 B1 | 8/2012 |
| GB | 2262971 A | 7/1993 |
| JP | 2010-107040 A | 5/2010 |
| JP | 2014-070703 A | 4/2014 |
| JP | 2017146277 A | 8/2017 |
| KR | 101756423 B1 | 7/2017 |
| KR | 10-2018-0106202 A | 10/2018 |
| WO | WO-2017182198 A1 | 10/2017 |

OTHER PUBLICATIONS

Written Opinion regarding PCT/US2020/041887, dated Oct. 30, 2020.
International Search Report regarding PCT/US2020/039794, dated Oct. 8, 2020.
Written Opinion regarding PCT/US2020/039794, dated Oct. 8, 2020.
U.S. Appl. No. 16/234,735, filed Dec. 28, 2018, Stefan Deferme.

(56) References Cited

OTHER PUBLICATIONS

International Search Report and Written Opinion for PCT/US2019/067439 dated Apr. 27, 2020; 6 pages.

* cited by examiner

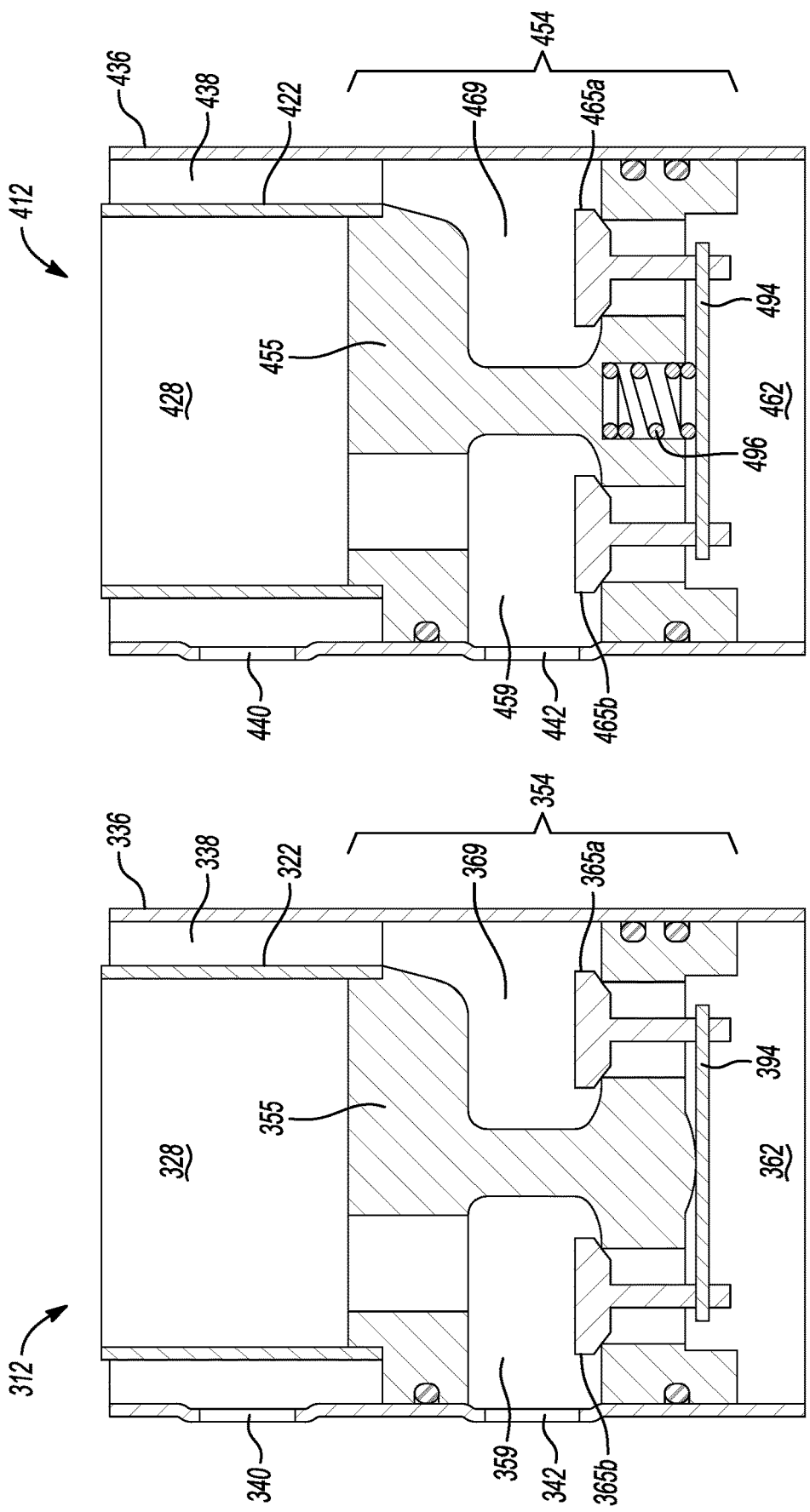

DAMPER WITH MULTIPLE EXTERNAL CONTROL VALVES

FIELD

The present disclosure generally relates to dampers. More particularly, the present disclosure relates to a damper with multiple externally mounted control valves.

BACKGROUND

This section provides background information related to the present disclosure which is not necessarily prior art Vehicles generally include dampers that are used in conjunction with suspension systems to absorb vibrations that occur while driving the vehicle. In order to absorb the vibrations, dampers are generally connected between a body and the suspension system of the vehicle. A piston is located within the damper. The piston is connected to the vehicle body or the suspension of the vehicle through a piston rod. The damper also includes a damper body that is connected to the suspension system. As the damper is compressed or extended, the piston may limit the flow of damping fluid between first and second working chambers that are defined within the damper body in order to produce a damping force that counteracts the vibrations. By further restricting the flow of damping fluid between the first and second working chambers of the damper, greater damping forces may be generated by the damper.

Dampers typically include one or more valves that control flow of fluid during extension and compression motions of the piston. Current damper designs include a valve block that provides mutual hydraulic connections between the first and second working chambers, the valves, and an accumulator. Such designs often make the damper bulky and increase the overall cost of the damper. Current dampers also have check values that further increase the size and cost of the damper.

SUMMARY

This section provides a general summary of the disclosure, and is not a comprehensive disclosure of its full scope or all of its features.

In accordance with one aspect of the present disclosure, a damper is provided. The damper includes an inner tube that extends longitudinally between first and second inner tube ends. The damper includes a piston slidably disposed within the inner tube. The piston defines a first working chamber and a second working chamber within the inner tube. The first working chamber is longitudinally positioned between the piston and the first inner tube end and the second working chamber is longitudinally positioned between the piston and the second inner tube end. The damper also includes an outer tube disposed around the inner tube. The outer tube extends longitudinally between first and second outer tube ends. The first working chamber is arranged in fluid communication with a fluid transport chamber that is disposed radially between the inner tube and the outer tube. The damper further includes a collector chamber that is positioned outside of the outer tube.

The damper includes an intake valve assembly that is positioned at the second inner tube end. The intake valve assembly abuts the outer tube to define an accumulation chamber between the intake valve assembly and the second outer tube end. The accumulation chamber is arranged in fluid communication with the collector chamber. The intake valve assembly includes a first intermediate chamber that is disposed in fluid communication with the accumulation chamber and the second working chamber. The intake valve assembly also includes a second intermediate chamber that is disposed in fluid communication with the accumulation chamber and the fluid transport chamber. The intake valve assembly further includes first and second intake valves. During compression strokes of the damper, the first intake valve controls fluid flow through the intake valve assembly between the accumulation chamber and the fluid transport chamber. During extension strokes of the damper, the second intake valve controls fluid flow through the intake valve assembly between the accumulation chamber and the second working chamber.

The damper also includes first and second control valves that are externally mounted to the outer tube. The first control valve has a first control valve inlet that is arranged in fluid communication with the fluid transport chamber and a first control valve outlet that is arranged in fluid communication with the collector chamber. The second control valve has a second control valve inlet that is arranged in fluid communication with the first intermediate chamber and a second control valve outlet that is arranged in fluid communication with the collector chamber. As a result, the first control valve controls the dampening level during extension strokes and the second control valve controls the damping level during compression strokes.

Because the first and second intake valves are part of an internal intake valve assembly that is positioned inside the outer tube between the accumulation chamber and the second inner tube end instead of in the first and second externally mounted control valve, the first and second control valves can be made smaller. Advantageously, this results in an improvement to the packaging dimensions of the damper.

The damper design disclosed herein applies to both mono-tube and dual-tube damper arrangements. In the mono-tube arrangement, the damper includes a floating piston that is slidably disposed in the outer tube between the intake valve assembly and the second end of the outer tube. In accordance with this arrangement, the accumulation chamber is positioned longitudinally between the intake valve assembly and the floating piston. A pressurized chamber is positioned longitudinally between the floating piston and the second end of the outer tube. The pressurized chamber contains a pressurized fluid, which operates to bias the floating piston towards the intake valve assembly.

In the dual-tube arrangement, the damper includes an intermediate tube that is disposed radially between the inner tube and the outer tube. The intermediate tube extends longitudinally between a first intermediate tube end that abuts an outside cylindrical surface of the first end of the inner tube and a second intermediate tube end that abuts an inside cylindrical surface of the outer tube. As a result, a reserve chamber is defined between the intermediate tube and the outer tube and the fluid transport chamber is defined between the intermediate tube and the inner tube.

BRIEF DESCRIPTION OF DRAWINGS

The drawings described herein are for illustrative purposes only of selected embodiments and not all possible implementations, and are not intended to limit the scope of the present disclosure.

FIG. 14 is a partial side cross-sectional view of another exemplary damper constructed in accordance with the present disclosure, where the intake valve assembly includes poppet valves that are biased by a spring plate; and FIG. 15 is a partial side cross-sectional view of another exemplary damper constructed in accordance with the present disclosure, where the intake valve assembly includes poppet valves that are biased by a spring plate and a coil spring.

DETAILED DESCRIPTION

Figure 1:
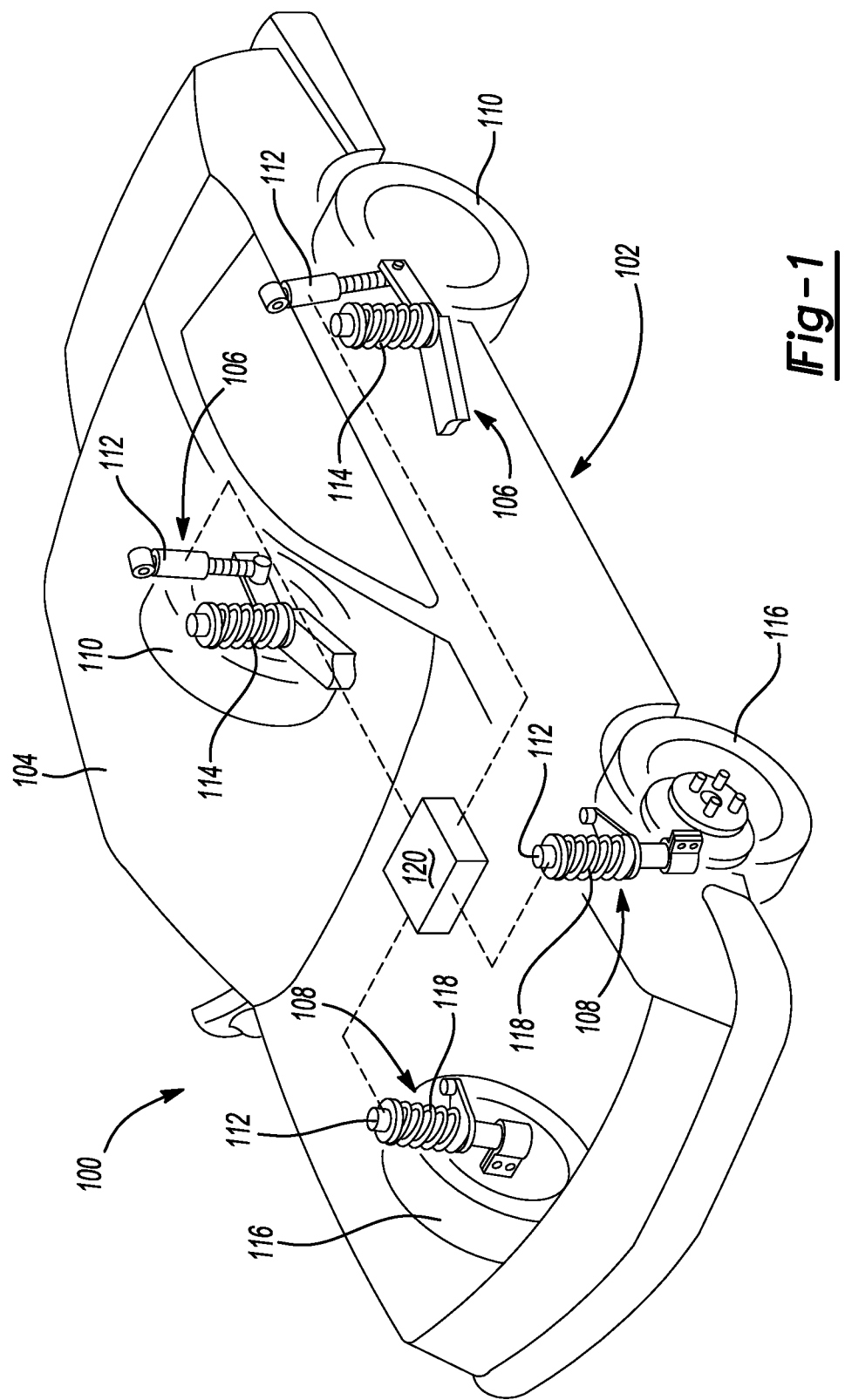
FIG. 1 is an illustration of a vehicle incorporating a suspension system constructed in accordance with the present disclosure.

Example embodiments will now be described more fully with reference to the accompanying drawings. Wherever possible, the same reference numbers will be used throughout the drawings to refer to same or like parts.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIG. 1 illustrates an exemplary vehicle 100 incorporating a suspension system 102 in accordance with the present disclosure. The vehicle 100 may be driven by an internal combustion engine, an electric motor, a hybrid/electric powertrain, or equivalents thereof. The vehicle 100 includes a body 104. The suspension system 102 of the vehicle 100 includes a rear suspension 106 and a front suspension 108. The rear suspension 106 includes a transversely extending rear axle assembly (not shown) adapted to operatively support a pair of rear wheels 110. The rear axle assembly is operatively connected to the body 104 by means of a pair of dampers 112 and a pair of helical coil springs 114. Similarly, the front suspension 108 includes a transversely extending front axle assembly (not shown) that supports a pair of front wheels 116. The front axle assembly is connected to the body 104 by means of another pair of dampers 112 and a pair of helical coil springs 118. In an alternative embodiment, the vehicle 100 may include an independent suspension unit (not shown) for each of the four corners instead of the front and rear axle assemblies.

The dampers 112 of the suspension system 102 serve to dampen the relative movement of the unsprung portion (i.e., the front and rear suspensions 108, 106 and the front and rear wheels 116, 110) and the sprung portion (i.e., the body 104) of the vehicle 100. While the vehicle 100 has been depicted as a passenger car, the dampers 112 may be used with other types of vehicles. Examples of such vehicles include buses, trucks, off-road vehicles, three-wheelers, ATVs, motor bikes, and so forth. Furthermore, the term "damper" as used herein will refer to dampers in general and will include shock absorbers, McPherson struts, and semi-active and active suspensions.

In order to automatically adjust each of the dampers 112, an electronic controller 120 is electrically connected to the dampers 112. The electronic controller 120 is used for controlling the operation of each of the dampers 112 in order to provide appropriate damping characteristics resulting from movements of the body 104 of the vehicle 100. The electronic controller 120 may independently control each of the dampers 112 in order to independently control a damping level of each of the dampers 112. The electronic controller 120 may be electrically connected to the dampers 112 via wired connections, wireless connections, or a combination thereof.

The electronic controller 120 may independently adjust the damping level, damping rate, or damping characteristics of each of the dampers 112 to optimize the ride performance of the vehicle 100. The term "damping level", as used herein, refers to a damping force produced by each of the dampers 112 to counteract movements or vibrations of the body 104. A higher damping level may correspond to a higher damping force. Similarly, a lower damping level may correspond to a lower damping force. Adjustment of the damping levels is beneficial during braking and turning of the vehicle 100 to counteract brake dive, during braking, and body roll during turns. In accordance with one embodiment of the present disclosure, the electronic controller 120 processes input signals from one or more sensors (not shown) of the vehicle 100 in order to control the damping level of each of the dampers 112. The sensors may sense one or more parameters of the vehicle 100, such as, but not limited to, displacement, velocity, acceleration, vehicle speed, steering wheel angle, brake pressure, engine torque, engine revolutions per minute (RPM), throttle pedal position, and so forth. The electronic controller 120 may further control the damping level of the dampers 112 based on a driving mode of the vehicle 100. The driving mode may include a sport mode and a comfort mode. A button (not shown) may allow a driver of the vehicle 100 to choose the driving mode of the vehicle 100. The electronic controller 120 may receive input signals based on an actuation of the button and control the dampers 112 accordingly.

In accordance with another embodiment of the present disclosure, the electronic controller 120 controls the damping level of each of the dampers 112 based on external road conditions, such as rain, snow, mud, and the like. In a further embodiment, the electronic controller 120 regulates the damping level of each of the dampers 112 based on internal vehicle conditions, such as a fuel level, occupancy of the vehicle, load, and so forth.

While the present disclosure is being illustrated with a single electronic controller 120, it is within the scope of the present disclosure to utilize a dedicated electronic controller for each of the dampers 112. The dedicated electronic controller may be located onboard each respective damper 112. Alternatively, the electronic controller 120 may be integrated into an Electronic Control Unit (ECU) of the vehicle 100. The electronic controller 120 may include a processor, memory, Input/Output (I/O) interfaces, communication interfaces, and other electrical components. The processor may execute various instructions stored in the memory for carrying out various operations of the electronic controller 120. The electronic controller 120 may receive and transmit signals and data through the I/O interfaces and the communication interfaces. In further embodiments, the electronic controller 120 may include microcontrollers, application-specific integrated circuits (ASICs), field programmable gate arrays (FPGAs), and so forth.

Figure 2:
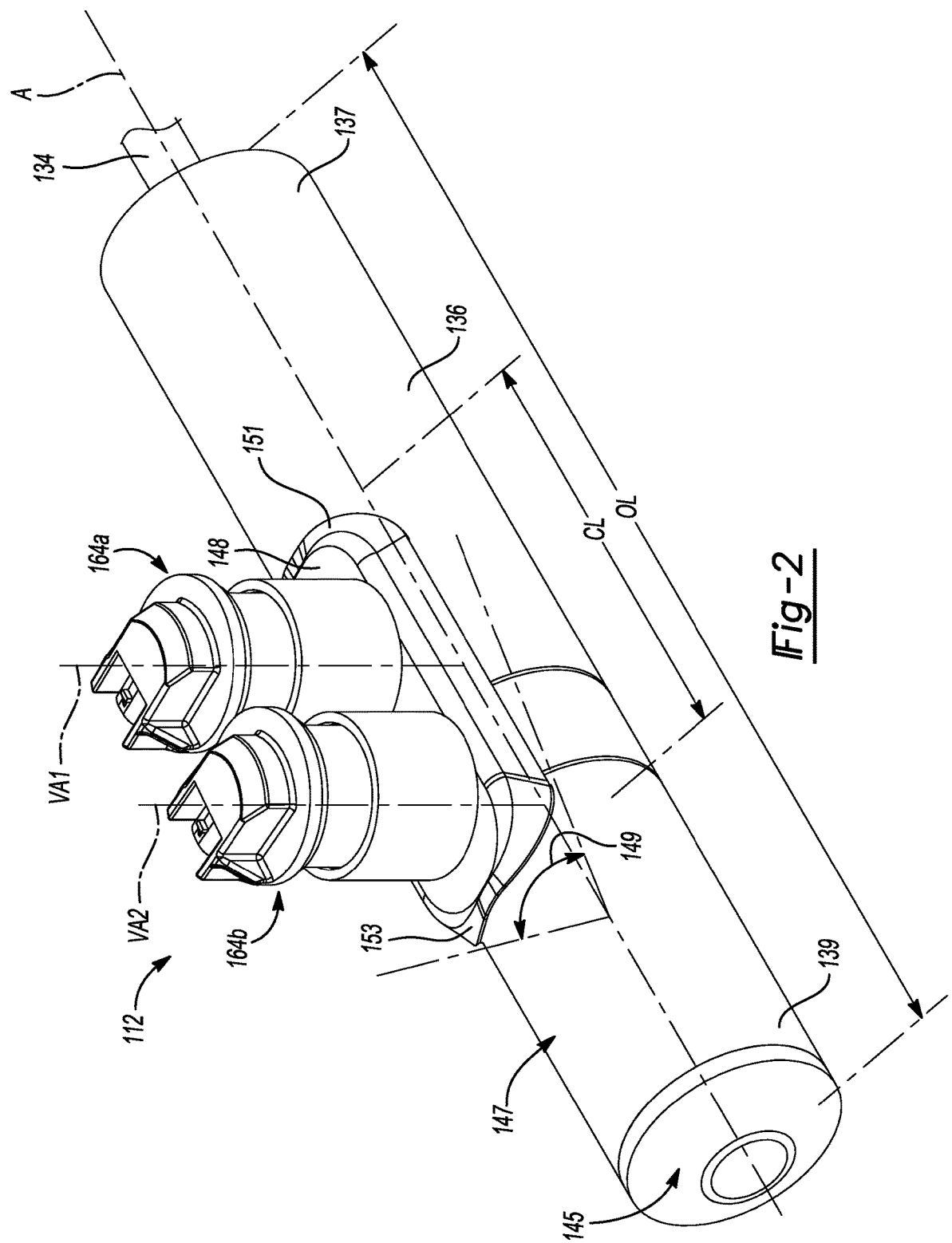
FIG. 2 is a front perspective view of an exemplary mono-tube damper constructed in accordance with the present disclosure.
Figure 3:
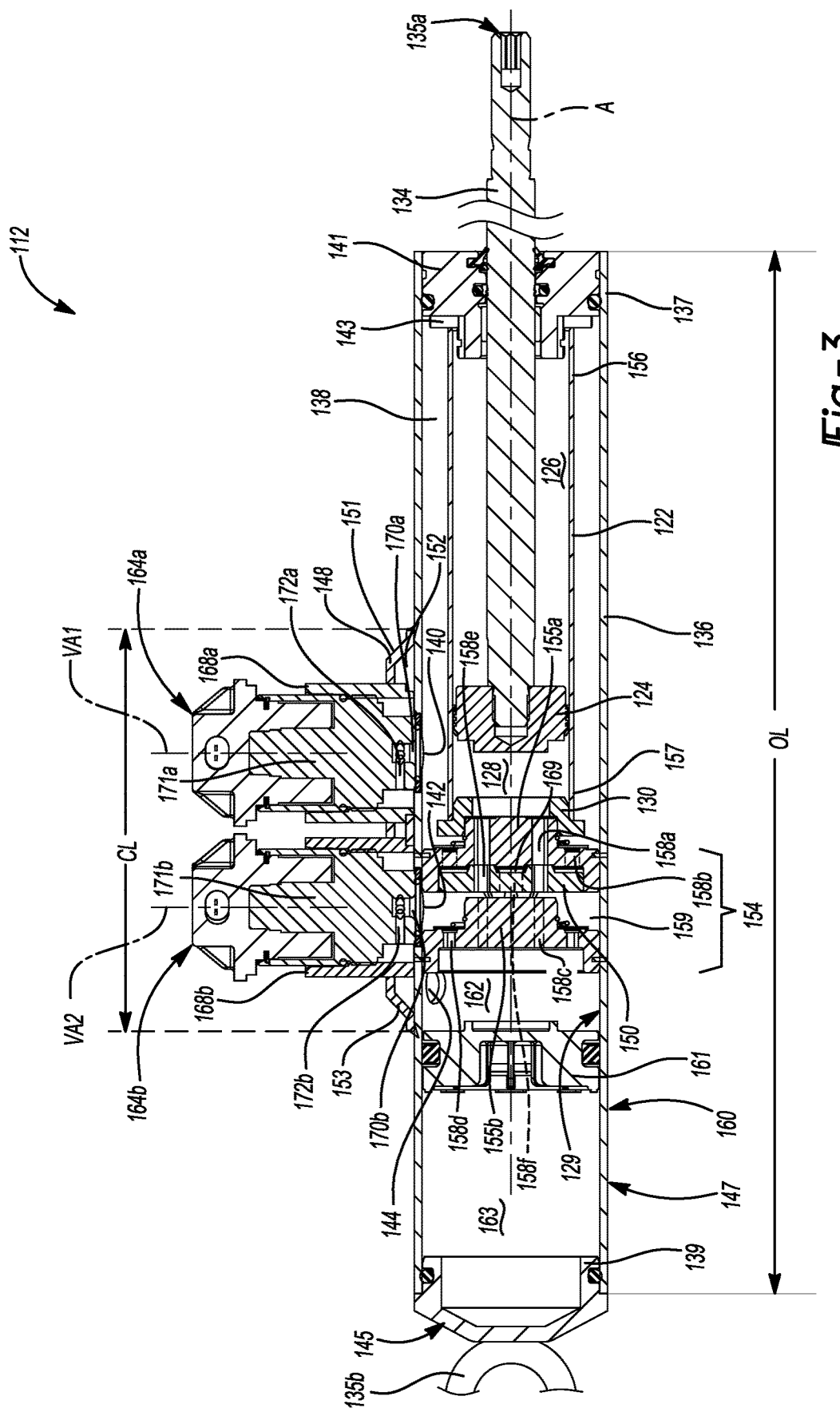
FIG. 3 is a side cross-sectional view of the exemplary damper shown in FIG. 2.

FIGS. 2 and 3 illustrate an exemplary damper 112, which has a mono-tube arrangement. The damper 112 may be any of the four dampers 112 of the vehicle 100. The damper 112 may optionally be configured as a Continuously Variable Semi-Active Suspension system damper 112. The damper 112 contains a fluid. By way of example and without limitation, the fluid is hydraulic fluid or oil. The damper 112 includes an inner tube 122 that extends longitudinally between a first inner tube end 156 and a second inner tube end 157. A piston 124 is slidably disposed within the inner tube 122. The piston 124 defines a first working chamber 126 and a second working chamber 128 within the inner tube 122. Each of the first and second working chambers 126, 128 contain the fluid therein. The first working chamber 126 is positioned longitudinally between the piston 124 and the first inner tube end 156 and acts as a rebound chamber during movement of the piston 124. The second working chamber 128 is positioned longitudinally between the piston 124 and the second inner tube end 157 and acts as a compression chamber. The volume of the first and second working chambers 126, 128 varies based on the movement of the piston 124. The piston 124 seals against the inside of the inner tube 122.

In the illustrated example, the piston 124 is free of orifices or passages such that there is no fluid flow through the piston 124. In other words, fluid in the first working chamber 126 cannot pass through the piston 124 into the second working chamber 128 or vice versa. However, alternative configurations are possible where the piston 124 includes valving (not shown) to limit high internal pressures within the first and second working chambers 126, 128.

The damper 112 includes a piston rod 134. The piston rod 134 is coaxially aligned with and defines a longitudinal axis A. One end of the piston rod 134 is connected to the piston 124 and reciprocates with the piston 124 whereas an opposite end of the piston rod 134 includes an attachment fitting 135a that is configured to be connected to a component of the suspension system 102 or the body 104 of the vehicle 100.

The damper 112 also includes an outer tube 136 disposed annularly around the inner tube 122 and includes an inner cylindrical surface 129 that faces and is spaced from the inner tube 122. In some embodiments, the outer tube 136 is concentrically disposed around the inner tube 122. The outer tube 136 extends longitudinally between a first outer tube end 137 and a second outer tube end 139. The piston rod 134 extends longitudinally out through the first outer tube end 137. The outer tube 136 includes a closed portion 145 at the second outer tube end 139 and a cylindrical portion 147 that extends from the first outer tube end 137 to the closed portion 145 at the second outer tube end 139. Optionally, an attachment fitting 135b is mounted to the closed portion 145 of the outer tube 136. The attachment fitting 135b is provided in the form of a hole, loop, threaded stud, or other attachment structure and is configured to attach to a component of the suspension system 102 or the body 104 of the vehicle 100.

The damper 112 further includes a fluid transport chamber 138 that is disposed between the inner tube 122 and the outer tube 136. The piston rod 134 extends longitudinally through a rod guide 141, which is housed inside the first outer tube end 137. In the illustrated embodiment, the entire rod guide 141 is received within the first outer tube end 137 while only a portion of the rod guide 141 is received within the first inner tube end 156. The rod guide 141 includes a rod guide passage 143 that is arranged in fluid communication with and that extends between the first working chamber 126 and the fluid transport chamber 138. Stated another way, the fluid transport chamber 138 is arranged in fluid communication with the first working chamber 126 via the rod guide passage 143.

Further, the damper 112 includes a cover member 148 attached to the outer tube 136. A collector chamber 152 is defined between the cover member 148 and the outer tube 136. The collector chamber 152 is positioned external to (i.e., radially outward of) the outer tube 136. The collector chamber 152 is arranged in fluid communication with the fluid transport chamber 138 via a first port 140 in the outer tube 136.

In the illustrated example, the collector chamber 152 has a limited circumferential extent that extends about the outer tube in an arc 149 that is less than or equal to 180 degrees. In other words, the collector chamber 152 in the illustrated example is a pocket that runs along one side of the outer tube 136 and is therefore distinguishable from an annular chamber, such as an annular chamber created by another tube disposed about the outer tube 136. The outer tube 136 has an outer tube length OL that is measured longitudinally between the first and second outer tube ends 137, 139 and the collector chamber 152 has a collector chamber length CL that is measured longitudinally between first and second collector ends 151, 153. The collector chamber length CL is shorter than the outer tube length OL. In other words, the collector chamber 152 is shorter than the outer tube 136 and does not run along the entire length of the outer tube 136.

The damper 112 also includes an intake valve assembly 154 with an intake valve seat 130 that is press-fit into the second inner tube end 157. The intake valve assembly 154 is disposed inside the outer tube 136 and includes a first valve body 155a that abuts the intake valve seat 130 and a second valve body 155b that is longitudinally spaced from the first valve body 155a. The first and second intake valve bodies 155a, 155b abut the inner cylindrical surface 129 of the outer tube 136 to define a first intermediate chamber 159 that is positioned longitudinally between the first and second valve bodies 155a, 155b and an accumulation chamber 162 that is positioned longitudinally between the second intake valve body 155b and the second outer tube end 139. The first intake valve body 155a forms a partition between the first intermediate chamber 159 and the fluid transport chamber 138 and the second intake valve body 155b forms a partition between the first intermediate chamber 159 and the accumulation chamber 162. Optionally, the first and second intake valve bodies 155a, 155b can be welded, crimped, or glued to the outer tube 136.

Figure 6:
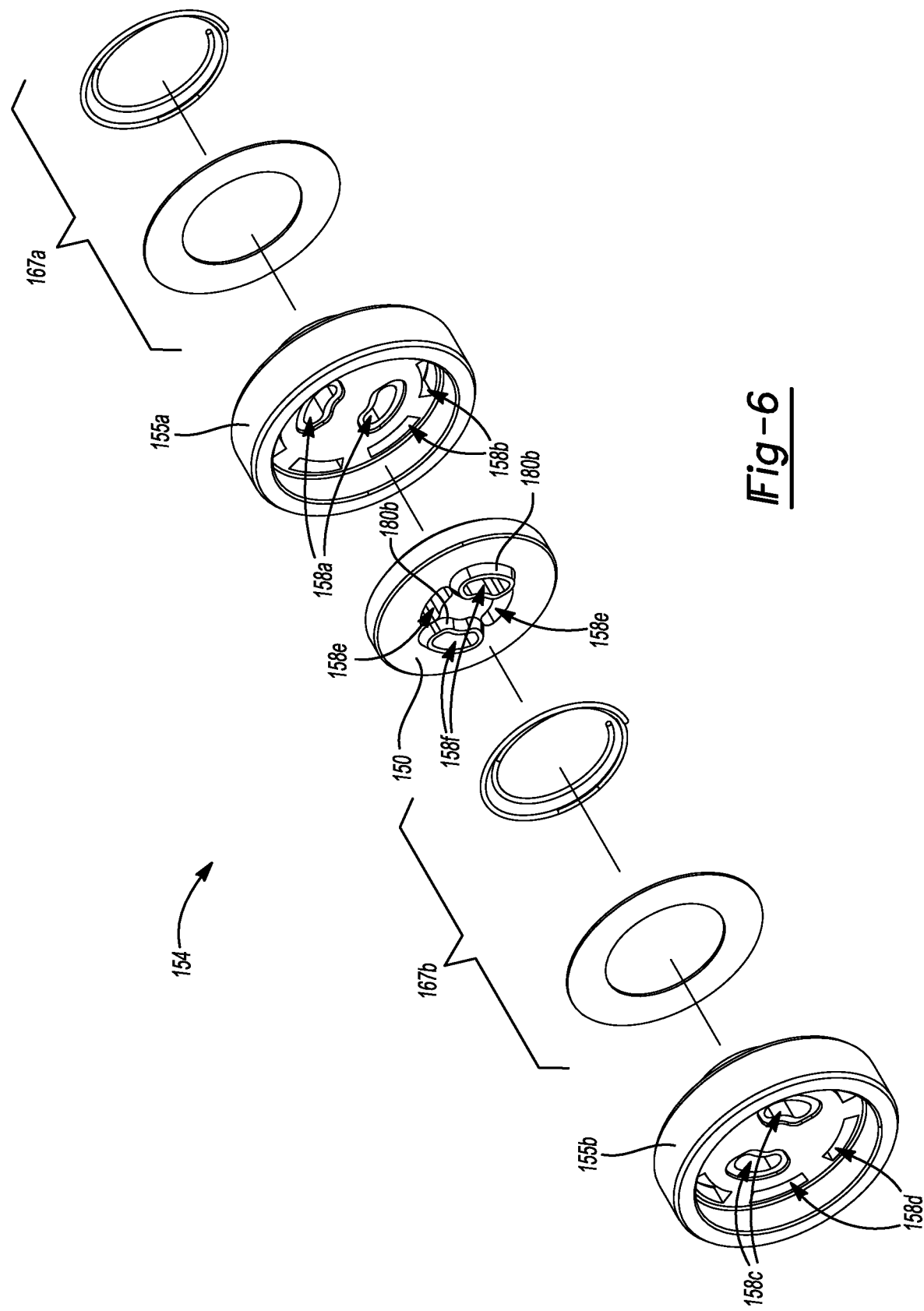
FIG. 6 is a front exploded perspective view of an exemplary intake valve assembly of the exemplary damper shown in FIG. 3.
Figure 7:
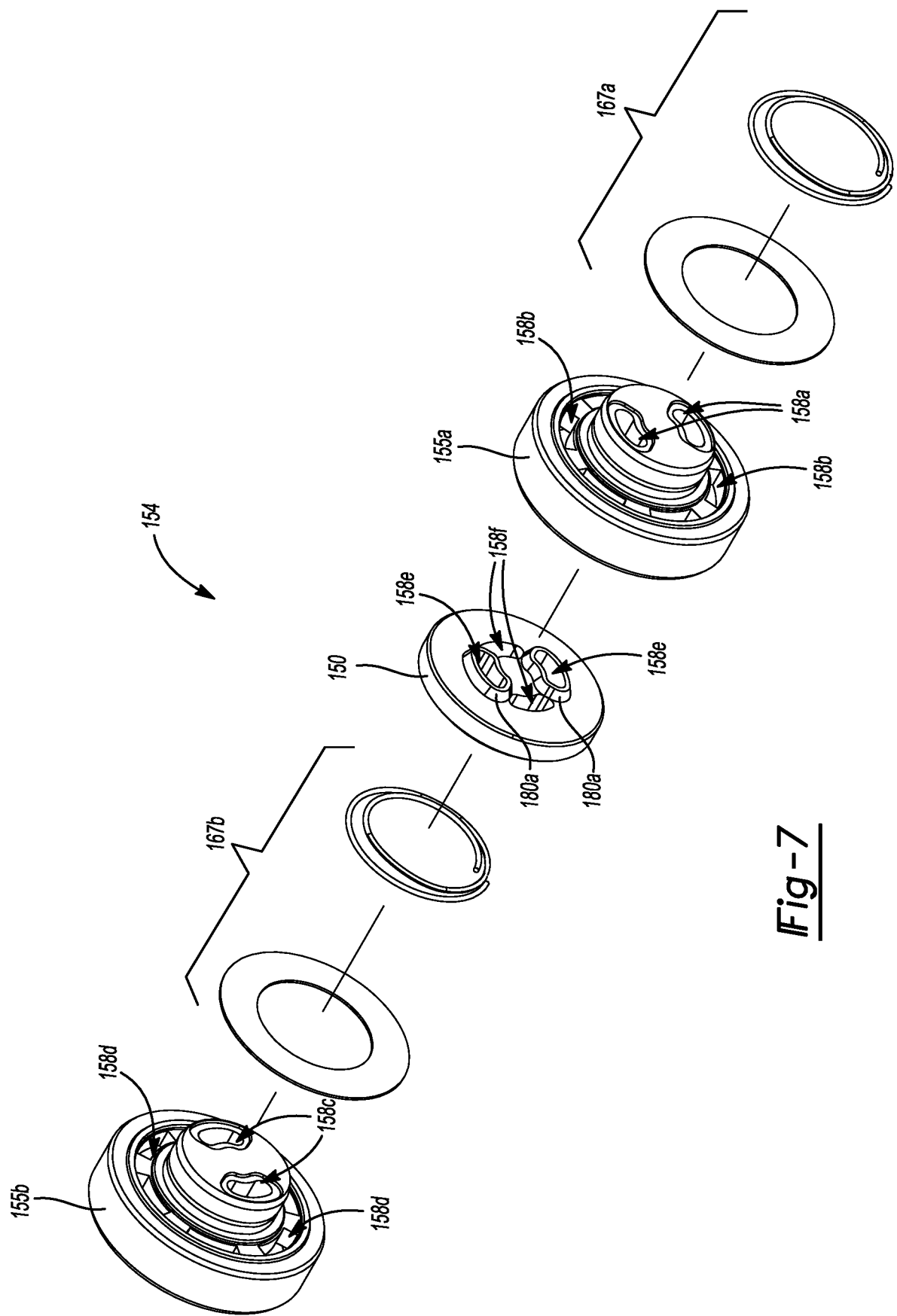
FIG. 7 is a back exploded perspective view of an exemplary intake valve assembly of the exemplary damper shown in FIG. 3.

The first intermediate chamber 159 and the accumulation chamber 162 are each arranged in fluid communication with the collector chamber 152 via second and third ports 142, 144 in the outer tube 136. With additional reference to FIGS. 6 and 7, the first intake valve body 155a includes a first set of intake passages 158a and a first set of intake orifices 158b that extend through the first intake valve body 155a. The first set of intake orifices 158b are arranged circumferentially around (i.e., are radially outward of) the first set of intake passages 158a. The second intake valve body 155b includes a second set of intake passages 158c and a second set of intake orifices 158d that extend through the second intake valve body 155b. The second set of intake orifices 158d are arranged circumferentially around (i.e., are radially outward of) the second set of intake passages 158c. The intake valve assembly 154 also includes an indexing disc 150, adjacent the first intake valve body 155a, that defines a second intermediate chamber 169 positioned longitudinally between the indexing disc 150 and at least a portion of the first intake valve body 155a.

The indexing disc 150 includes a first set of intake openings 158e and a second set of intake openings 158f, which extend through the indexing disc 150 at different circumferential positions. In the illustrated example, the first set of intake openings 158e are indexed at a circumferential spacing of 90 degrees relative to the second set of intake openings 158f. The first set of intake openings 158e are aligned with the first set of intake passages 158a in the first intake valve body 155a. The first set of intake openings 158e are disposed in fluid communication with and are configured to transport fluid between the first set of intake passages 158a and the first intermediate chamber 159. The first set of intake openings 158e have a first seal interface 180a that contacts and seals against the first intake valve body 155a such that fluid in the first set of intake passages 158a can only flow between the first intermediate chamber 159 and the second working chamber 128. Fluid cannot flow between the second intermediate chamber 169 and the second working chamber 128 via the first set of intake passages 158a due to the first seal interface 180a between the indexing disc 150 and the first intake valve body 155a.

The second set of intake openings 158f are aligned with the second set of intake passages 158c in the second intake valve body 155b. The second set of intake openings 158f are disposed in fluid communication with and are configured to transport fluid between the second set of intake passages 158c and the second intermediate chamber 169. The second set of intake openings 158f have a second seal interface 180b that contacts and seals against the second intake valve body 155b such that fluid in the second set of intake passages 158c can only flow between the accumulation chamber 162 and the second intermediate chamber 169. Fluid cannot flow between the first intermediate chamber 159 and the accumulation chamber 162 via the second set of intake passages 158c due to the second seal interface 180b between the indexing disc 150 and the second intake valve body 155b.

The first set of intake orifices 158b allow fluid communication between the second intermediate chamber 169 and the fluid transport chamber 138. The intake valve assembly 154 further comprises a first intake valve 165a that controls fluid flow through the first set of intake orifices 158b between the second intermediate chamber 169 and the fluid transport chamber 138. In the illustrated example, the first intake valve 165a is a passive valve. More specifically, in the illustrated embodiment, the first intake valve 165a includes a first spring disc stack 167a that is mounted to the first intake valve body 155a. In operation, the first spring disc stack 167a opens and closes the first intake orifices 158b by flexing towards and away from the first intake valve body 155a based on a pressure differential between the second intermediate chamber 169 and the fluid transport chamber 138. The first intake valve 165a acts as a one-way valve that permits fluid flow in only one direction from the second intermediate chamber 169 to the fluid transport chamber 138. As will be explained in greater detail below, this one-way flow through the first intake valve 165a occurs during compression strokes, which is where the piston 124 moves toward the intake valve assembly 154.

The second set of intake orifices 158d allow fluid communication between the accumulation chamber 162 and the first intermediate chamber 159. The intake valve assembly 154 further comprises a second intake valve 165b that controls fluid flow through the second set of intake orifices 158d between the accumulation chamber 162 and the first intermediate chamber 159. In the illustrated example, the second intake valve 165b is a passive valve. More specifically, in the illustrated embodiment, the second intake valve 165b includes a second spring disc stack 167b that is mounted to the second intake valve body 155b. In operation, the second spring disc stack 167b opens and closes the second intake orifices 158d by flexing towards and away from the second intake valve body 155b based on a pressure differential between the accumulation chamber 162 and the first intermediate chamber 159. The second intake valve 165b acts as a one-way valve that permits fluid flow in only one direction from the accumulation chamber 162 and the first intermediate chamber 159. As will be explained in greater detail below, this one-way flow through the second intake valve 165b occurs during extension strokes, which is where the piston 124 moves away from the intake valve assembly 154.

The intake valve assembly 154 may optionally include bleed passages (not shown) that are separate from the intake openings, intake passages, and intake orifices 158a-f. The bleed passages can be provided in a slotted disc (not shown) or as grooves or passages in the first and second intake valve bodies 155a, 155b. The bleed passages can be tuned to limit fluid flow through the intake valve assembly 154 during compression and extension strokes of the damper 112. Alternatively or in addition to the bleed passages, the intake valve assembly 154 may include bleed discs or passive valves to limit the pressure differential across the intake valve assembly 154.

In accordance with the illustrated embodiment, the damper 112 includes an accumulator 160. In the illustrated example of FIG. 2, the accumulator 160 is a piston accumulator. Alternatively, the accumulator 160 may include a bladder accumulator. In the illustrated example, the accumulator 160 is disposed within the second outer tube end 139. The accumulator chamber 162 of the accumulator 160 contains a fluid. Further, the accumulator 160 includes a floating piston 161 and a pressurized chamber (e.g., a gas chamber) 163. The pressurized chamber 163 is sealably separated from the accumulation chamber 162 by the floating piston 161. The floating piston 161 is slidably disposed in the outer tube 136 between the intake valve assembly 154 and the second outer tube end 139. Therefore, the accumulation chamber 162 is positioned longitudinally between the intake valve assembly 154 and the floating piston 161. The pressurized chamber 163 is positioned longitudinally between the floating piston 161 and the second outer tube end 139. The pressurized chamber 163 contains a pressurized fluid, such as a gas, that operates to bias the floating piston 161 towards the intake valve assembly 154. In an alternative embodiment, the accumulator 160 may be located external to the outer tube 136 of the damper 112. Such configurations can be used to provide packaging flexibility. For example, the use of an externally mounted accumulator 160 can reduce the overall length of the damper 112.

The damper 112 includes first and second control valves 164a, 164b that are externally mounted to the outer tube 136. In the illustrated example, the first and second control valves 164a, 164b are two-position, solenoid actuated electro-hydraulic valves. However, it should be appreciated that other types of active (e.g., electric) or passive (e.g., mechanical) externally mounted valves can be used. As will be explained in greater detail below, the first control valve 164a is operable to regulate fluid flow from the fluid transport chamber 138 to the collector chamber 152 and the second control valve 164b is operable to regulate fluid flow from the first intermediate chamber 159 to the collector chamber 152. The first control valve 264a includes a first valve member 171a that is moveable along a first control valve axis VA1 between an open position and a closed position. The second control valve 264b includes a second valve member 171b that is moveable along a second control valve axis VA2 between an open position and a closed position. Although other configurations are possible, in the illustrated embodiment, wherein the first and second control valve axes VA1 and VA2 are parallel and longitudinally spaced apart from one another and are arranged perpendicular to the longitudinal axis A of the piston rod 134.

The electronic controller 120 may regulate the first and second control valves 164a, 164b in order to control the damping level of the damper 112. The first and second control valves 164a, 164b may be controlled by input currents provided to the solenoids of the first and second control valves 164a, 164b. The electronic controller 120 generates the input current in order to control the operation and the damping level of the damper 112. The solenoids of the first and second control valves 164a, 164b may be connected in electrical communication with the electronic controller 120. Further, the input current may vary between lower and upper limits, which correspond to the least and most restrictive positions (i.e., an open position and a closed position) of the first and second control valves 164a, 164b. The electronic controller 120 may control the damping force or level by controlling a degree of restriction of the first and second control valves 164a, 164b. Specifically, the electronic controller 120 may regulate the input currents to vary the restriction of the first and second control valves 164a, 164b. Sending a low current to the first and second control valves 164a, 164b may correspond to a low damping ratio or damping level. Similarly, sending a high current to the first and second control valves 164a, 164b may correspond to a high damping ratio or damping level.

The first control valve 164a has a first control valve inlet 170a that is arranged in fluid communication with the fluid transport chamber 138 between the inner and outer tubes 122, 136 and a first control valve outlet 172a that is arranged in fluid communication with the collector chamber 152. The first port 140 in the outer tube 136 is arranged in fluid communication with and extends between the fluid transport chamber 138 and the first control valve inlet 170a.

The second control valve 164b has a second control valve inlet 170b that is arranged in fluid communication with the first intermediate chamber 159 between the first and second intake valve bodies 155a, 155b and a second control valve outlet 172b that is arranged in fluid communication with the collector chamber 152. The second port 142 in the outer tube 136 is arranged in fluid communication with and that extends between the first intermediate chamber 159 and the second control valve inlet 170b. The third port 144 in the outer tube 136 is arranged in fluid communication with and that extends between the collector chamber 152 and the accumulation chamber 162. As a result, the accumulator chamber 162 is arranged in fluid communication with the collector chamber 152 via the third port 144 in the outer tube 136.

During an extension (i.e., rebound) stroke of the damper 112, the first control valve 164a is operable to regulate fluid flow from the fluid transport chamber 138 to the collector chamber 152 in response to movement of the piston 124 towards the rod guide 141. The first control valve 164a is in the open position during extension strokes of the damper 112 to control rebound damping characteristics of the damper 112. Specifically, the degree of port of the first control valve 164a may be regulated to adjust the extension/rebound damping characteristics of the damper 112. The second control valve 164b is in the closed position during extension strokes of the damper 112. As a result, there is no communication of fluid directly between the first intermediate chamber 159 and the collector chamber 152 during an extension stroke.

During a compression stroke, the second control valve 164b is operable to regulate fluid flow from the first intermediate chamber 159 to the collector chamber 152 in response to movement of the piston 124 towards the intake valve assembly 154. The second control valve 164b is in the open position during compression strokes of the damper 112 to control compression damping characteristics of the damper 112. Specifically, the degree of port of the second control valve 164b may be regulated to adjust the compression damping characteristics of the damper 112. The first control valve 164a is in the closed position during compression strokes of the damper 112. As a result, there is no communication of fluid directly between the fluid transport chamber 138 and the collector chamber 152 during a compression stroke.

In the illustrated example, each of the first and second control valves 164a, 164b includes a control valve housing 168a, 168b. A portion of each control valve housing 168a, 168b is received within and extends through the cover member 148. Though the first and second ports 140, 142 in the outer tube 136 are illustrated as circular apertures in FIG. 2, the shape and dimensions of the first and second ports 140, 142 in the outer tube 136 may be based on any shape and dimensions of the control valve housings 168a, 168b.

In the open position, the first control valve 164a allows fluid communication between the fluid transport chamber 138 and the collector chamber 152. More particularly, the first control valve inlet 170a is in fluid communication with the fluid transport chamber 138 and the first control valve outlet 172a is in fluid communication with the collector chamber 152. The first valve member 171a allows selective fluid communication between the first control valve inlet 170a and the first control valve outlet 172a and therefore selective fluid flow between the fluid transport chamber 138 and the collector chamber 152, which ultimately regulates fluid flow from the first working chamber 126 to the accumulation chamber 162.

In the open position, the second control valve 164b allows fluid communication between the first intermediate chamber 159 and the collector chamber 152. More particularly, the second control valve inlet 170b is in fluid communication with the first intermediate chamber 159 and the second control valve outlet 172b is in fluid communication with the collector chamber 152. The second valve member 171b allows selective fluid communication between the second control valve inlet 170b and the second control valve outlet 172b and therefore selective fluid flow between the first intermediate chamber 159 and the collector chamber 152, which ultimately regulates fluid flow from the second working chamber 128 to the accumulation chamber 162.

The intake valve assembly 154 allows bi-directional flow of fluid between the accumulation chamber 162 to the second working chamber 128. During compression strokes, the volume of the first working chamber 126 increases as the piston 124 moves towards the intake valve assembly 154. The first intake valve 165a in the intake valve assembly 154 provides a compensating fluid flow where fluid in the accumulation chamber 162 flows through the intake valve assembly 154, into the fluid transport chamber 138, and ultimately passes into the first working chamber 126 to increase the amount of fluid in the first working chamber 126. During extension/rebound strokes, the volume of the first working chamber 126 decreases as the piston 124 moves away from the intake valve assembly 154. The second intake valve 165b in the intake valve assembly 154 provides a compensating fluid flow where fluid in the accumulation chamber 162 flows through the intake valve assembly 154 and into the second working chamber 128 to increase the amount of fluid in the second working chamber 128.

Operation of the damper 112 during the rebound and compression strokes will now be explained in greater detail.

Figure 4:
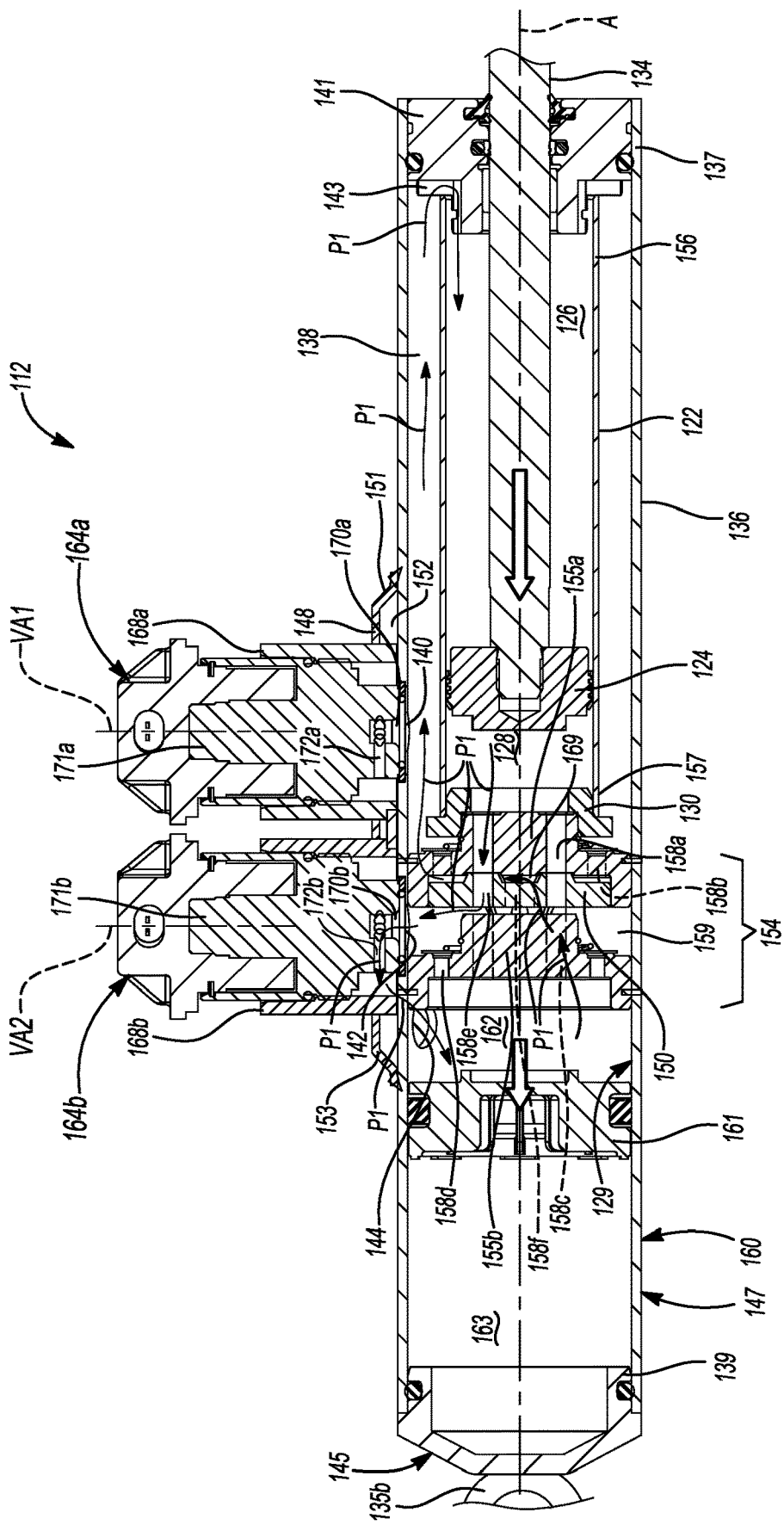
FIG. 4 is an enlarged side cross-sectional view of the exemplary damper shown in FIG. 3, where arrows are included illustrating the fluid flow path through the damper during a compression stroke.

With reference to FIG. 4, the damper 112 is shown in a compression stroke, which occurs when the piston 124 moves towards the intake valve assembly 154. During a compression stroke, the volume of the fluid in the first working chamber 126 that is displaced by the piston rod 134 increases and the volume of the second working chamber 128 decreases. An additional flow of fluid must be supplied to the first working chamber 126 to compensate for the increase in the volume of the first working chamber 126. Further, during the compression stroke, there is a net flow of fluid into the accumulation chamber 162, which causes the floating piston 161 to move away from the intake valve assembly 154, increasing the size of the accumulation chamber 162. This net flow of fluid into the accumulation chamber 162 occurs due to the increase in the volume of the piston rod 134 in the first working chamber 126.

During a compression stroke, the first control valve 164a is in a closed position, the second control valve 164b is in an open position, and the piston 124 moves towards the intake valve assembly 154. A compression flow path P1 is defined inside the damper 112, where fluid in the second working chamber 128 flows through the first set of intake passages 158a in the first intake valve body 155a, through the first set of intake openings 158e in the indexing disc 150, and into the first intermediate chamber 159. Fluid in the first intermediate chamber 159 flows to the second control valve inlet 170b and passes through the second port 142 in the outer tube 136. Fluid from the second control valve inlet 170b flows to the second control valve outlet 172b because the second control valve 164b is in the open position and fluid from the second control valve outlet 172b flows into the collector chamber 152. Fluid from the collector chamber 152 flows into the accumulation chamber 162 via the third port 144 in the outer tube 136. Fluid in the accumulation chamber 162 flows through the second set of intake passages 158c in the second intake valve body 155b, through the second set of intake openings 158f in the indexing disc 150, through the second intermediate chamber 169 between the indexing disc 150 and the first intake valve body 155a, through the first set of intake orifices 158b in the first intake valve body 155a, through the fluid transport chamber 138, and through the rod guide passages 143 into the first working chamber 126, which increases in volume during compression strokes.

Figure 5:
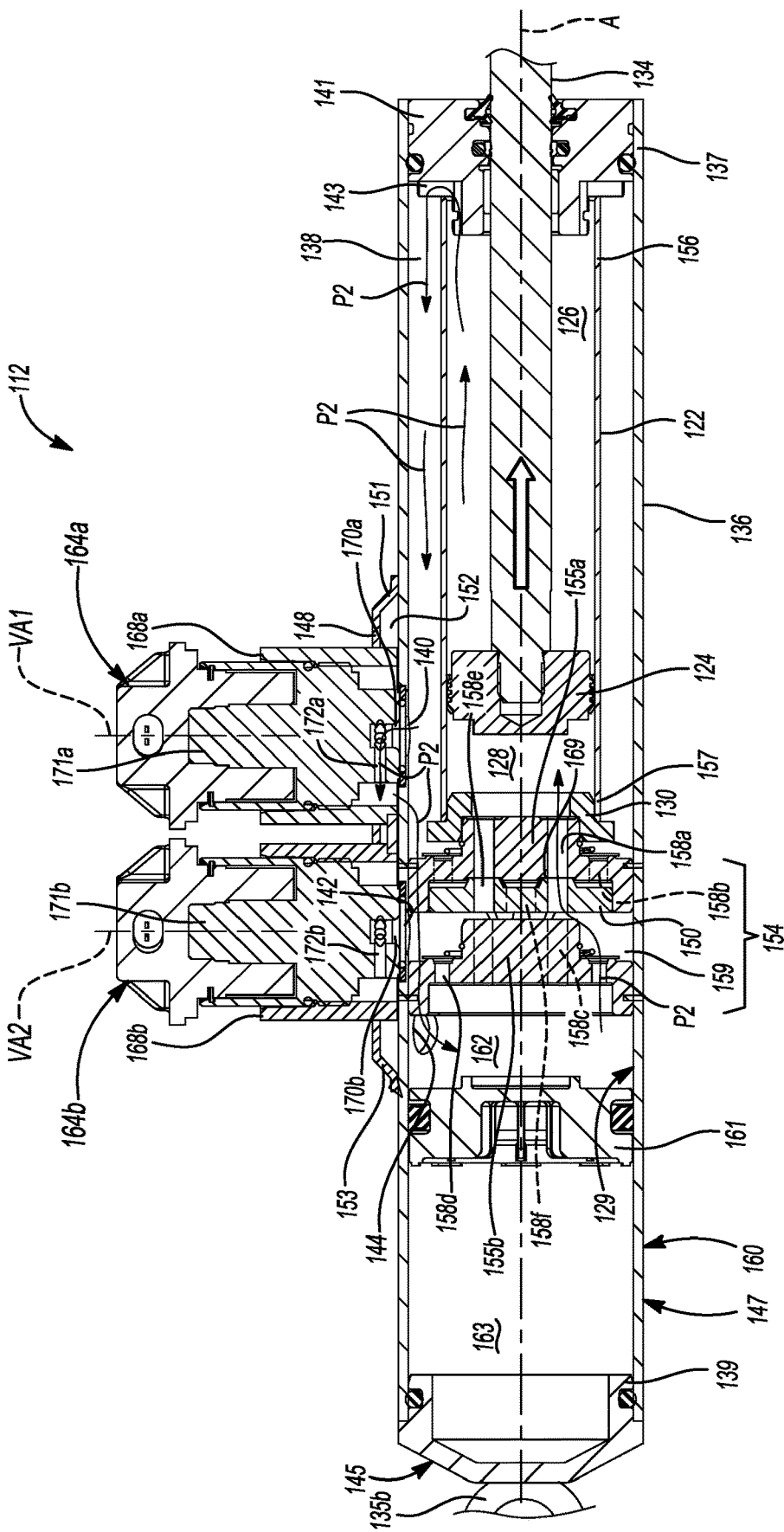
FIG. 5 is another enlarged side cross-sectional view of the exemplary damper shown in FIG. 3, where arrows are included illustrating the fluid flow path through the damper during an extension stroke.

With reference to FIG. 5, the damper 112 is shown in an extension/rebound stroke, which occurs when the piston 124 moves away from the intake valve assembly 154. During the extension/rebound stroke, the volume of the fluid in the first working chamber 126 that is displaced by the piston rod 134 decreases and the volume of fluid in the second working chamber 128 increases. An additional flow of fluid must be supplied to the second working chamber 128 to compensate for the increase in the volume of the second working chamber 128. In order to increase the amount of fluid in the second working chamber 128, some portion of the fluid from the accumulation chamber 162 flows through the intake valve assembly 154 and into the second working chamber 128 such that an extension flow path P2 is defined within the damper 112. Further, during the extension/rebound stroke, there is a net flow of fluid out of the accumulation chamber 162, which causes the floating piston 161 to move towards the intake valve assembly 154, decreasing the size of the accumulation chamber 162. This net flow of fluid out of the accumulation chamber 162 occurs due to the decrease in the volume of the piston rod 134 in the first working chamber 126.

During an extension/rebound stroke, the first control valve 164a is in an open position, the second control valve 164b is in a closed position, and the piston 124 moves away from the intake valve assembly 154. Fluid in the first working chamber 126 flows into the fluid transport chamber 138 via the rod guide passages 143. Fluid in the fluid transport chamber 138 then flows to the first control valve inlet 170a and passes through the first port 140 in the outer tube 136. Fluid from the first control valve inlet 170a flows to the outlet 172 of the single control valve 164 because the first control valve 164a is in the open position and fluid from the first control valve outlet 172a flows into the collector chamber 152. Fluid from the collector chamber 152 flows into the accumulation chamber 162 via the third port 144 in the outer tube 136. Finally, fluid in the accumulation chamber 162 flows through the intake valve assembly 154 and into the second working chamber 128. Specifically, fluid in the accumulation chamber 162 flows through the second set of intake orifices 158d in the second intake valve body 155b, through the first intermediate chamber 159, through the first set of intake openings 158e in the indexing disc 150, through the first set of intake passages 158a in the first intake valve body 155a, and into the second working chamber 128, which increases in volume during extension/rebound strokes.

It should be appreciated that the second port 142 in the outer tube 136 is positioned in the first intermediate chamber 159 in the intake valve assembly 154. On the other hand, none of the ports 140, 142, 144 in the outer tube 136 are positioned in the second intermediate chamber 169. As a result, fluid flows through the first intermediate chamber 159 during both compression and extension strokes. In a compression stroke, fluid enters the first intermediate chamber 159 via the first intake passages 158a in the first intake valve body 155a and the first intake openings 158e in the indexing disc 150 and exits the first intermediate chamber 159 via the second port 142 in the outer tube 136. In an extension stroke, fluid enters the first intermediate chamber 159 via the second intake orifices 158d in the second intake valve body 155b and exits the first intermediate chamber 159 via the first intake openings 158e in the indexing disc 150 and the first intake passages 158a in the first intake valve body 155a. By contrast, fluid flows through the second intermediate chamber 169 during only the compression stroke, where fluid enters the second intermediate chamber 169 via the second intake passages 158c in the second intake valve body 155b and the second intake openings 158f in the indexing disc 150 and exits the second intermediate chamber 169 via the first intake orifices 158b in the first intake valve body 155a.

Figure 8:
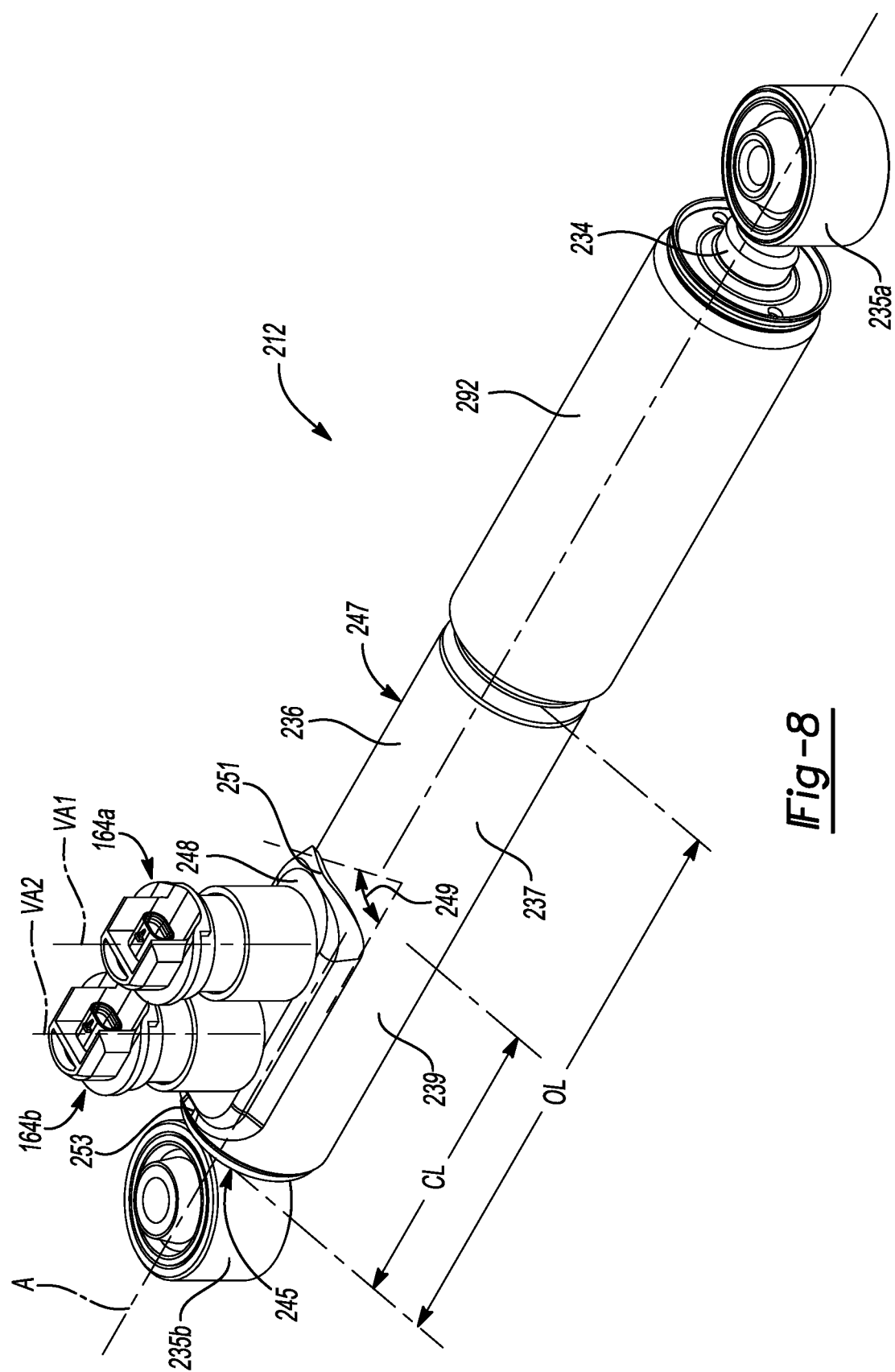
FIG. 8 is a front perspective view of an exemplary dual-tube damper constructed in accordance with the present disclosure.
Figure 9:
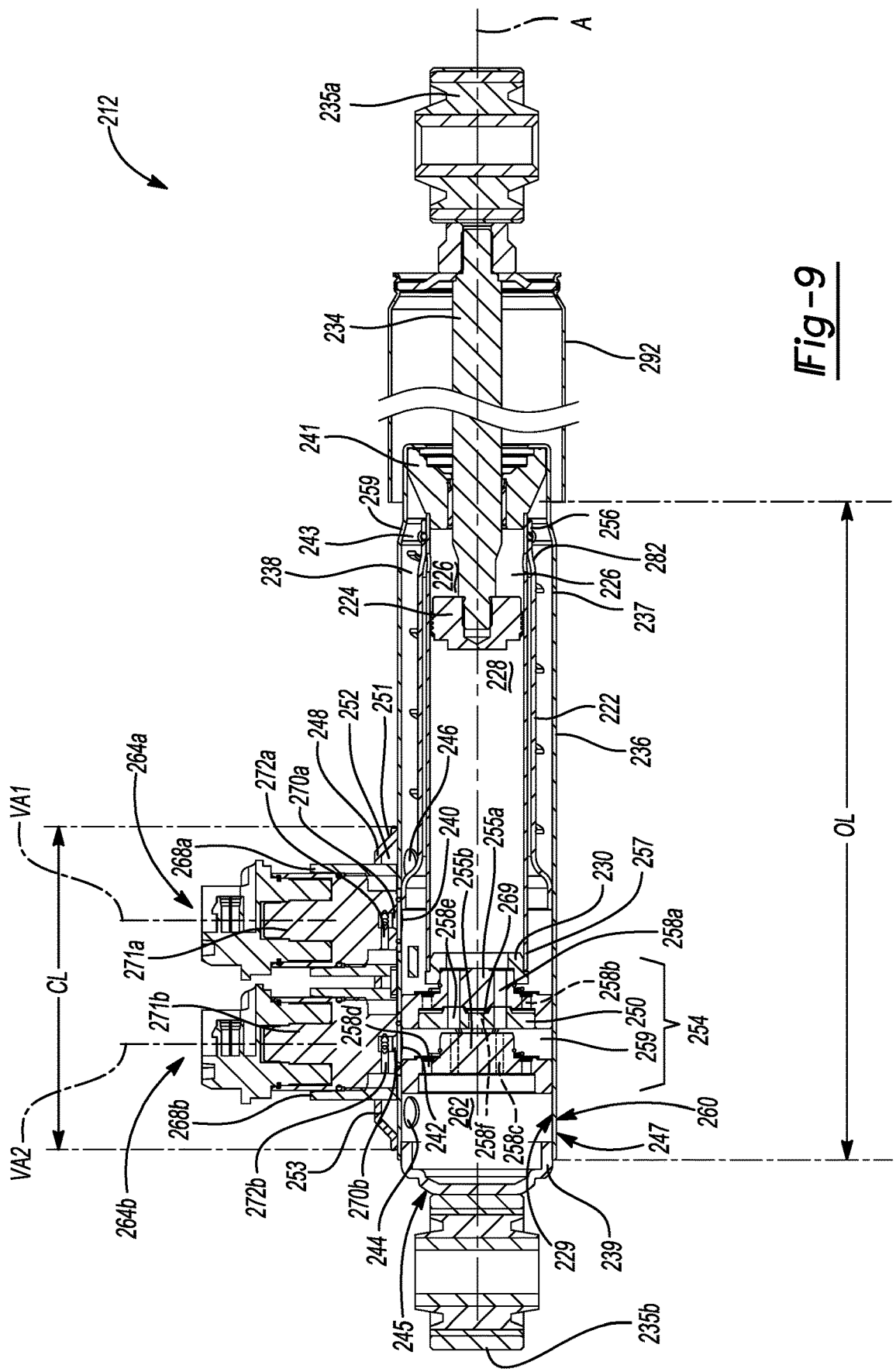
FIG. 9 is a side cross-sectional view of the exemplary damper shown in FIG. 7.

FIGS. 8 and 9 illustrate an exemplary damper 212, which has a dual-tube arrangement. Many of the elements of the damper 212 shown in FIGS. 8 and 9 are the same or substantially the same as the elements of the damper 112 shown in FIGS. 2 and 3, except as noted below. Equivalent elements shared between the embodiments have corresponding reference numbers where reference numerals in the 100s are used in FIGS. 2 and 3 and corresponding reference numerals in the 200s are used in FIGS. 8 and 9.

The damper 212 shown in FIGS. 8 and 9 does not have the floating piston 161 and pressurized chamber 163 like the damper 112 shown in FIGS. 2 and 3. Instead, the damper 212 shown in FIGS. 8 and 9 has an intermediate tube 280 that is disposed radially between the inner tube 222 and the outer tube 236. The intermediate tube 280 extends longitudinally between a first intermediate tube end 282 and a second intermediate tube end 284. The first intermediate tube end 282 abuts an outside cylindrical surface of inner tube 222 near the first inner tube end 256 and the second intermediate tube end 284 abuts an inside cylindrical surface of the outer tube 236 near the collector chamber 252 such that a fluid transport chamber 238 is defined between the inner tube 222 and the intermediate tube 280 and a reserve chamber 286 is defined between the intermediate tube 280 and the outer tube 236. The first working chamber 226 is arranged in fluid communication with the fluid transport chamber 238 via ports 259 in the first inner tube end 256.

The outer tube 236 includes first, second, third, and fourth ports 240, 242, 244, 246. The first port 240 in the outer tube 236 is arranged in fluid communication with and extends between the fluid transport chamber 238 and the first control valve inlet 270a. The second port 242 in the outer tube 236 is arranged in fluid communication with and extends between the first intermediate chamber 259 and the second control valve inlet 270b. The third port 244 in the outer tube 236 is arranged in fluid communication with and extends between the collector chamber 252 and the accumulation chamber 262. Finally, the fourth port 246 in the outer tube 236 is arranged in fluid communication with and extends between the collector chamber 252 and the reserve chamber 286. Optionally, the intermediate tube 280 may include one or more helical ribs 288 that extend helically about an outside surface 290 of the intermediate tube 280. The helical ribs 288 extend radially outwardly from the outside surface 290 of the intermediate tube 280 toward the outer tube 236 and create a tortuous flow path in the reserve chamber 286, which can reduce foaming of the fluid in the reserve chamber 286.

The piston rod 234 includes a first attachment fitting 235a and the closed portion 245 of the outer tube 236 includes a second attachment fitting 235b, which are configured to be connected to the body 104 and suspension system 102 of the vehicle 100. Optionally, a guard 292 may be attached to the piston rod 234. The guard 292 extends annularly about and protects the piston rod 234.

In the illustrated example, the second intermediate tube end 284 is longitudinally spaced from the intake valve assembly 254 and the first port 240 extends through the outer tube 236 at a location that is longitudinally between the second intermediate tube end 284 and the first intake valve body 255a.

In accordance with this embodiment, both the accumulation chamber 262 and the reserve chamber 286 are arranged in fluid communication with the collector chamber 252 via the third and fourth ports 244, 246 in the outer tube 236, respectively. The intake valve assembly 254 has first and second intake valve bodies 255a, 255b that abut the inner cylindrical surface 229 of the outer tube 236. The first intermediate chamber 259 is positioned longitudinally between the first and second valve bodies 255a, 255b and the accumulation chamber 262 is positioned longitudinally between the second intake valve body 255b and the second outer tube end 239. The first intake valve body 255a forms a partition between the first intermediate chamber 259 and the fluid transport chamber 238 and the second intake valve body 255b forms a partition between the first intermediate chamber 259 and the accumulation chamber 262.

Figure 12:
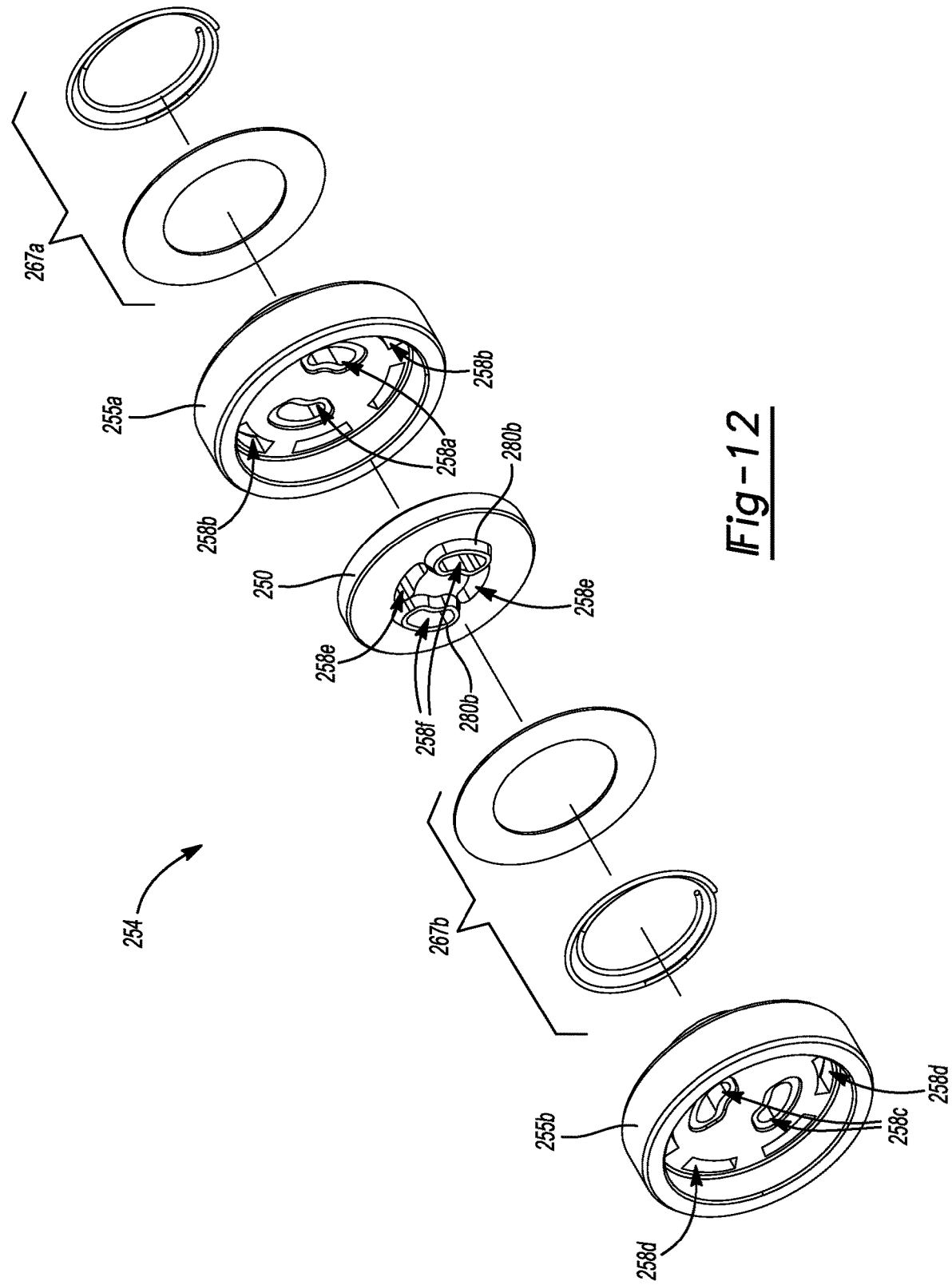
FIG. 12 is a front exploded perspective view of an exemplary intake valve assembly of the exemplary damper shown in FIG. 9.
Figure 13:
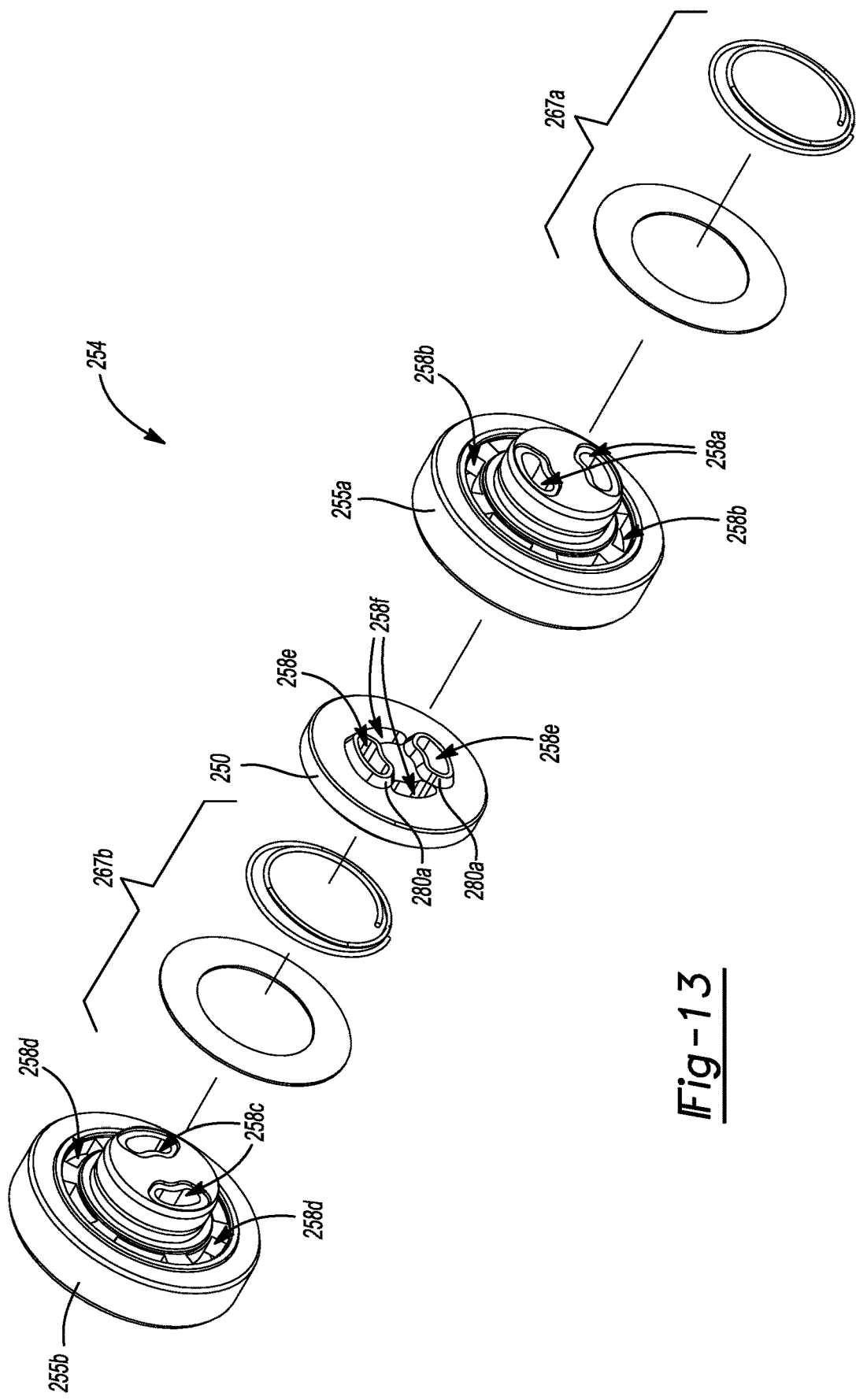
FIG. 13 is a back exploded perspective view of an exemplary intake valve assembly of the exemplary damper shown in FIG. 9.

With additional reference to FIGS. 12 and 13, the first intake valve body 255a includes a first set of intake passages 258a and a first set of intake orifices 258b that extend through the first intake valve body 255a. The first set of intake orifices 258b are arranged circumferentially around (i.e., are radially outward of) the first set of intake passages 258a. The second intake valve body 255b includes a second set of intake passages 258c and a second set of intake orifices 258d that extend through the second intake valve body 255b. The second set of intake orifices 258d are arranged circumferentially around (i.e., are radially outward of) the second set of intake passages 258c. The intake valve assembly 254 also includes an indexing disc 250, abutting the first intake valve body 255a, that defines a second intermediate chamber 269 positioned longitudinally between the indexing disc 250 and at least a portion of the first intake valve body 255a.

The indexing disc 250 includes a first set of intake openings 258e and a second set of intake openings 258f, which extend through the indexing disc 250 at different circumferential positions. In the illustrated example, the first set of intake openings 258e are indexed at a circumferential spacing of 90 degrees relative to the second set of intake openings 258f. The first set of intake openings 258e are aligned with the first set of intake passages 258a in the first intake valve body 255a. The first set of intake openings 258e are disposed in fluid communication with and are configured to transport fluid between the first set of intake passages 258a and the first intermediate chamber 259. The first set of intake openings 258e have a first seal interface 280a that contacts and seals against the first intake valve body 255a such that fluid in the first set of intake passages 258a can only flow between the first intermediate chamber 259 and the second working chamber 228. Fluid cannot flow between the second intermediate chamber 269 and the second working chamber 228 via the first set of intake passages 258a due to the first seal interface 280a between the indexing disc 250 and the first intake valve body 255a.

The second set of intake openings 258f are aligned with the second set of intake passages 258c in the second intake valve body 255b. The second set of intake openings 258f are disposed in fluid communication with and are configured to transport fluid between the second set of intake passages 258c and the second intermediate chamber 269. The second set of intake openings 258f have a second seal interface 280b that contacts and seals against the second intake valve body 255b such that fluid in the second set of intake passages 258c can only flow between the accumulation chamber 262 and the second intermediate chamber 269. Fluid cannot flow between the first intermediate chamber 259 and the accumulation chamber 262 via the second set of intake passages 258c due to the second seal interface 280b between the indexing disc 250 and the second intake valve body 255b.

The first set of intake orifices 258b allow fluid communication between the second intermediate chamber 269 and the fluid transfer chamber 238. The intake valve assembly 254 further comprises a first intake valve 265a that controls fluid flow through the first set of intake orifices 258b between the second intermediate chamber 269 and the fluid transfer chamber 238. In the illustrated example, the first intake valve 265a is a passive valve. More specifically, in the illustrated embodiment, the first intake valve 265a includes a first spring disc stack 267a that is mounted to the first intake valve body 255a. In operation, the first spring disc stack 267a opens and closes the first intake orifices 258b by flexing towards and away from the first intake valve body 255a based on a pressure differential between the second intermediate chamber 269 and the fluid transfer chamber 238. The first intake valve 265a acts as a one-way valve that permits fluid flow in only one direction from the second intermediate chamber 269 to the fluid transfer chamber 238. As will be explained in greater detail below, this one-way flow through the first intake valve 265a occurs during compression strokes, which is where the piston 224 moves toward the intake valve assembly 254.

The second set of intake orifices 258d allow fluid communication between the accumulation chamber 262 and the first intermediate chamber 259. The intake valve assembly 254 further comprises a second intake valve 265b that controls fluid flow through the second set of intake orifices 258d between the accumulation chamber 262 and the first intermediate chamber 259. In the illustrated example, the second intake valve 265b is a passive valve. More specifically, in the illustrated embodiment, the second intake valve 265b includes a second spring disc stack 267b that is mounted to the second intake valve body 255b. In operation, the second spring disc stack 267b opens and closes the second intake orifices 258d by flexing towards and away from the second intake valve body 255b based on a pressure differential between the accumulation chamber 262 and the first intermediate chamber 259. The second intake valve 265b acts as a one-way valve that permits fluid flow in only one direction from the accumulation chamber 262 and the first intermediate chamber 259. As will be explained in greater detail below, this one-way flow through the second intake valve 265b occurs during extension strokes, which is where the piston 224 moves away from the intake valve assembly 254.

Figure 10:
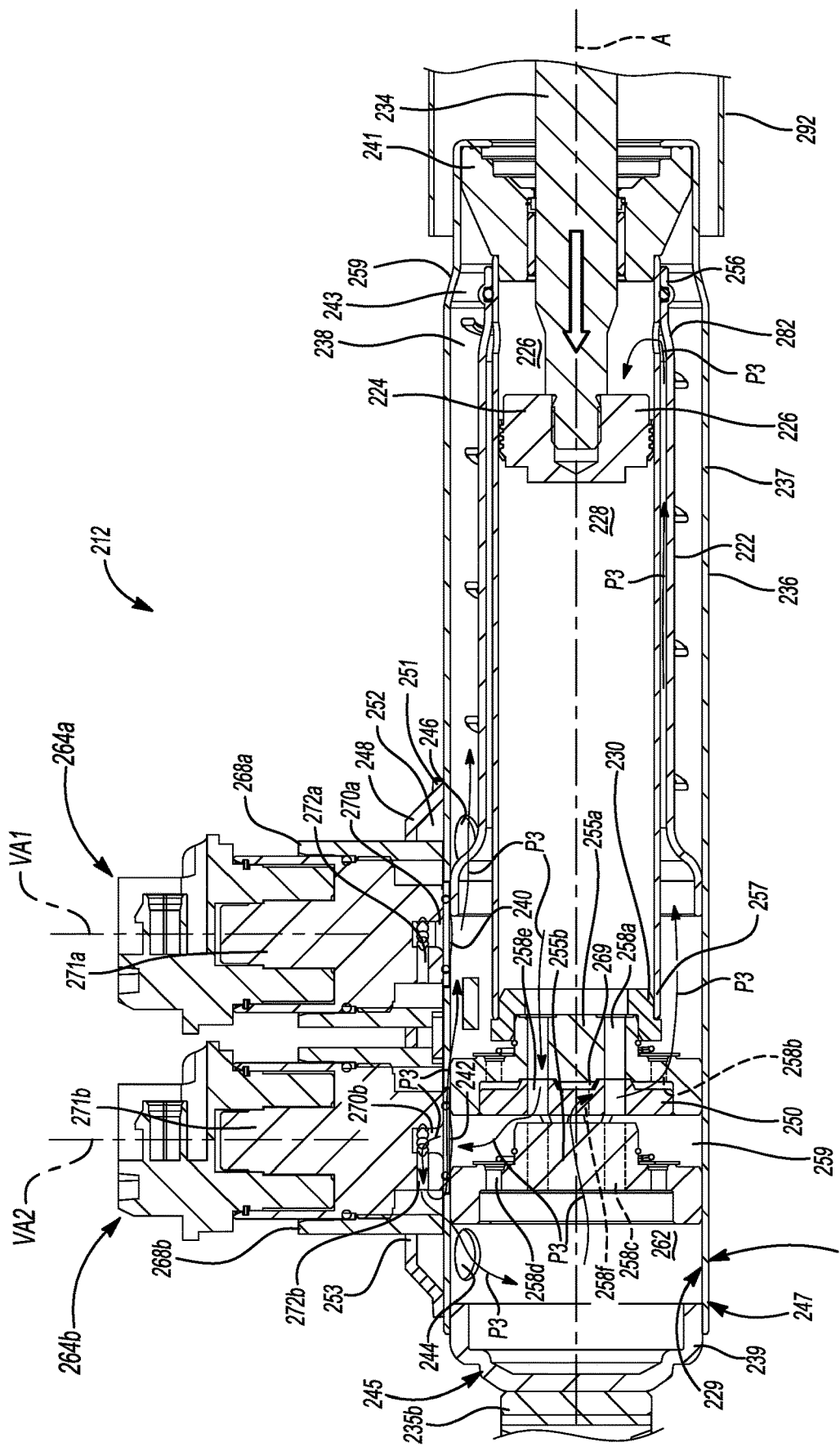
FIG. 10 is an enlarged side cross-sectional view of the exemplary damper shown in FIG. 9, where arrows are included illustrating the fluid flow path through the damper during a compression stroke.

With reference to FIG. 10, the damper 212 is shown in a compression stroke, which occurs when the piston 224 moves towards the intake valve assembly 254. During a compression stroke, a compression flow path P3 is defined within the damper 212 where fluid in the second working chamber 228 flows through the first set of intake passages 258a in the first intake valve body 255a, through the first set of intake openings 258e in the indexing disc 250, and into the first intermediate chamber 259. Fluid in the first intermediate chamber 259 flows to the second control valve inlet 270b and passes through the second port 242 in the outer tube 136. Fluid from the second control valve inlet 270b flows to the second control valve outlet 272b because the second control valve 264b is in the open position and fluid from the second control valve outlet 272b flows into the collector chamber 252. Fluid from the collector chamber 252 flows into the accumulation chamber 262 via the third port 244 in the outer tube 236 and into the reserve chamber 286 via the fourth port 246 in the outer tube 236. Fluid in the accumulation chamber 262 flows through the second set of intake passages 258c in the second intake valve body 255b, through the second set of intake openings 258f in the indexing disc 250, through the second intermediate chamber 269 between the indexing disc 250 and the first intake valve body 255a, through the first set of intake orifices 258b in the first intake valve body 255a, through the fluid transport chamber 238, and through the rod guide passages 243 into the first working chamber 226, which increases in volume during compression strokes.

Figure 11:
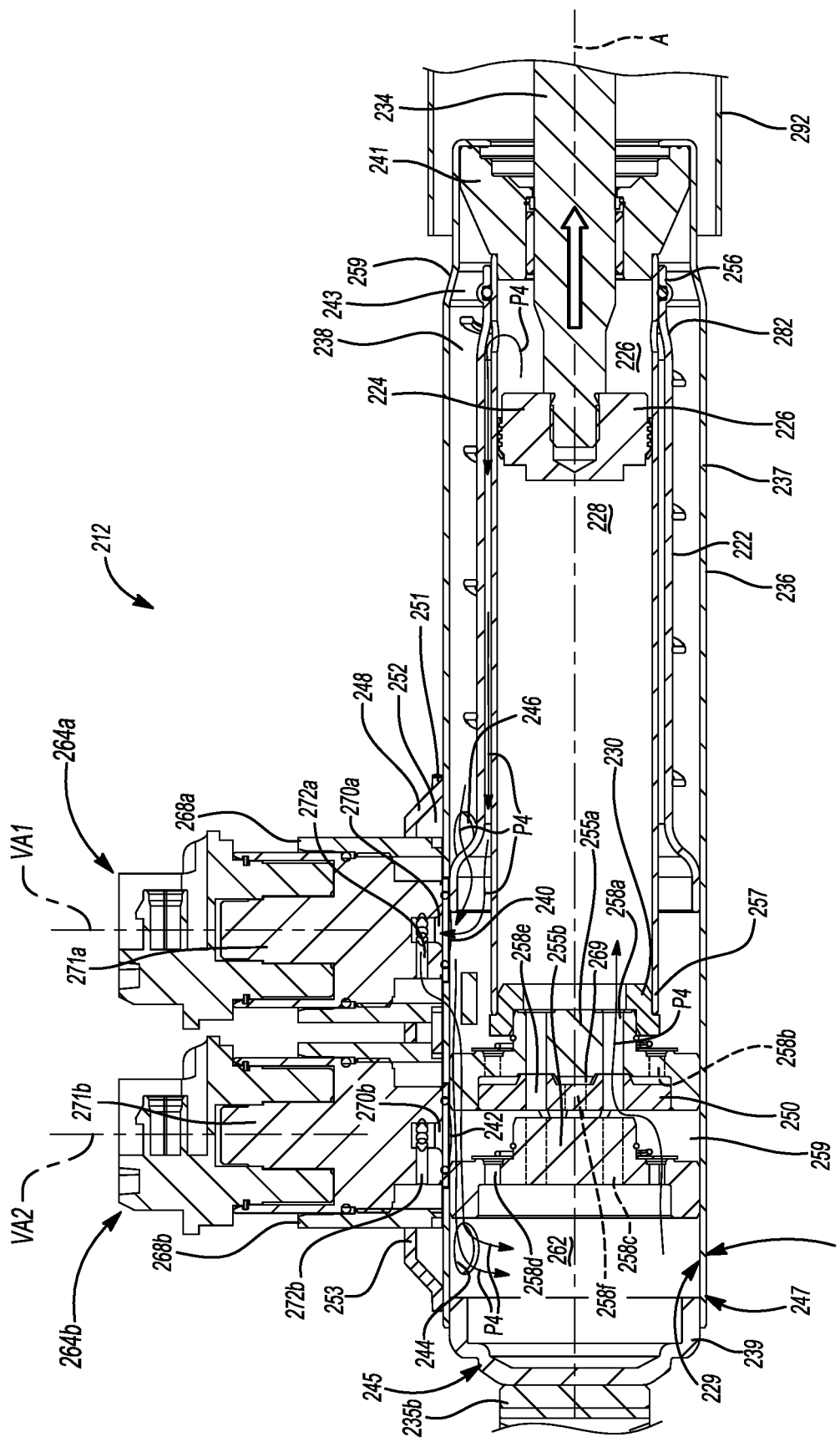
FIG. 11 is another enlarged side cross-sectional view of the exemplary damper shown in FIG. 10, where arrows are included illustrating the fluid flow path through the damper during an extension stroke.

With reference to FIG. 11, the damper 212 is shown in an extension/rebound stroke, which occurs when the piston 224 moves away from the intake valve assembly 254. During the extension/rebound stroke, an extension flow path P4 is defined inside the damper 212 where fluid in the first working chamber 226 flows into the fluid transport chamber 238 via the rod guide passages 243 in the rod guide 241. Fluid in the fluid transport chamber 238 then flows to the first control valve inlet 270a and passes through the first port 240 in the outer tube 236. Fluid from the first control valve inlet 270a flows to the first control valve outlet 272a because the first control valve 264a is in the open position and fluid from the first control valve outlet 272a flows into the collector chamber 252. Fluid from the reserve chamber 286 also flows into the collector chamber 252 via the fourth port 246 in the outer tube 236. Fluid from the collector chamber 252 flows into the accumulation chamber 262 via the third port 244 in the outer tube 236. Finally, fluid in the accumulation chamber 262 flows through the intake valve assembly 254 and into the second working chamber 228. Specifically, fluid in the accumulation chamber 262 flows through the second set of intake orifices 258d in the second intake valve body 255b, through the first intermediate chamber 259, through the first set of intake openings 258e in the indexing disc 250, through the first set of intake passages 258a in the first intake valve body 255a, and into the second working chamber 228, which increases in volume during extension/rebound strokes.

It should be appreciated that the second port 242 in the outer tube 236 is positioned in the first intermediate chamber 259 in the intake valve assembly 254. On the other hand, none of the ports 240, 242, 244, 246 in the outer tube 236 are positioned in the second intermediate chamber 269. As a result, fluid flows through the first intermediate chamber 259 during both compression and extension strokes. By contrast, fluid flows through the second intermediate chamber 269 during only the compression stroke.

As explained above, the degree and speed in which the first control valves 164a, 264a open during extension/rebound strokes and the degree and speed in which the second control valves 164b, 264b open during compression strokes can be controlled by the electronic controller 120 to control or change the damping level and therefore the extension/rebound and compression damping curves of the dampers 112, 212. The damper 212 illustrated in FIGS. 8-13 could alternatively be modified to include a floating piston accumulator arrangement much like the accumulator 160 and floating piston 161 shown in FIGS. 3-5. The combination of the dual-tube arrangement of the damper 212 with a floating piston accumulator provides additional packaging flexibility and can help reduce the overall length of the damper 212.

The intake valve assemblies 154, 254 for the dampers 112, 212 shown in FIGS. 3-7 and 9-13 can alternatively be replaced with the intake valve assembly 354 shown in FIG. 14 or the intake valve assembly 454 shown in FIG. 15. In both of these alternatives, the first and second valve bodies 155a, 155b, 255a, 255b in the intake valve assemblies 154, 254 shown in FIGS. 3-7 and 9-13 are replaced with one-piece valve bodies 355, 455. In addition, the intake valve assemblies 354, 454 shown in FIGS. 14 and 15 have first and second intake valves 365a, 365b, 465a, 465b that are configured as poppets instead of spring discs.

Many of the elements of the dampers 312, 412 shown in FIGS. 14 and 15 are the same or substantially the same as the elements of the dampers 112, 212 shown in FIGS. 3-7 and 9-13, except as noted below. Equivalent elements shared between the embodiments have corresponding reference numbers where reference numerals in the 100s and 200s are used in FIGS. 3-7 and 9-13 and corresponding reference numerals in the 300s and 400s are used in FIGS. 14 and 15, respectively.

With reference to FIG. 14, at least part of the one-piece intake valve body 355 is received in the inner tube 322 and the one-piece intake valve body 355 seals against the outer tube 236. The one-piece intake valve body 355 includes a first intake valve chamber 359 that is disposed in fluid communication with the second working chamber 328 and the accumulation chamber 362. The second intake valve 365b is operable to control fluid flow through the first intake valve chamber 359 from the accumulation chamber 362 to the second working chamber 328 during extension/rebound strokes. The one-piece intake valve body 355 includes a second intake valve chamber 369 that is disposed in fluid communication with the fluid transport chamber 338 between the inner and outer tubes 322, 336 and the accumulation chamber 362. The first intake valve 365a is operable to control fluid flow through the second intake valve chamber 369 from the accumulation chamber 362 to the fluid transport chamber 338 during compression strokes. As previously explained, the first port 340 in the outer tube 336 is arranged in fluid communication with the fluid transport chamber 338.

The first and second intake valves 365a, 365b are connected to a spring plate 394 that rests against the one-piece intake valve body 355 and biases the first and second intake valves 365a, 365b to a closed position. The spring plate 394 flexes and allows the first and/or second intake valves 365a, 365b to move to an open position based on the pressure differential between the accumulation chamber 362 and the first and/or second intake valve chambers 359, 369. The first and second intake valves 365a, 365b therefore operate as passive, one-way valves.

With reference to FIG. 15, at least part of the one-piece intake valve body 455 is received in the inner tube 422 and the one-piece intake valve body 455 seals against the outer tube 436. The one-piece intake valve body 455 includes a first intake valve chamber 459 that is disposed in fluid communication with the second working chamber 428 and the accumulation chamber 462. The second intake valve 465b is operable to control fluid flow through the first intake valve chamber 459 from the accumulation chamber 462 to the second working chamber 428 during extension/rebound strokes. The one-piece intake valve body 455 includes a second intake valve chamber 469 that is disposed in fluid communication with the fluid transport chamber 438 between the inner and outer tubes 422, 436 and the accumulation chamber 462. The first intake valve 465a is operable to control fluid flow through the second intake valve chamber 469 from the accumulation chamber 462 to the fluid transport chamber 438 during compression strokes. As previously explained, the first port 440 in the outer tube 436 is arranged in fluid communication with the fluid transport chamber 438.

The first and second intake valves 465a, 465b are connected to a spring plate 494 that rests against a coil spring 496 that is positioned in the one-piece intake valve body 455. Together, the spring plate 494 and the coil spring 496 bias the first and second intake valves 465a, 465b to a closed position. The spring plate 494 and/or the coil spring 496 flex and allow the first and/or second intake valves 465a, 465b to move to an open position based on the pressure differential between the accumulation chamber 462 and the first and/or second intake valve chambers 459, 469. The first and second intake valves 465a, 465b therefore operate as passive, one-way valves.

While aspects of the present disclosure have been particularly shown and described with reference to the embodiments above, it will be understood by those skilled in the art that various additional embodiments may be contemplated by the modification of the disclosed dampers without departing from the spirit and scope of what is disclosed. Such embodiments should be understood to fall within the scope of the present disclosure as determined based upon the claims and any equivalents thereof.

What is claimed is:

1. A damper comprising:
    an inner tube extending longitudinally between a first inner tube end and a second inner tube end;
    a piston slidably disposed within the inner tube defining a first working chamber and a second working chamber;
    an outer tube disposed around the inner tube, the first working chamber arranged in fluid communication with a fluid transport chamber disposed between the inner tube and the outer tube;
    a collector chamber positioned outside of the outer tube;
    an intake valve assembly positioned at the second inner tube end and within the outer tube to define an accumulation chamber arranged in fluid communication with the collector chamber, the intake valve assembly including a first intermediate chamber disposed in fluid communication with the accumulation chamber and the second working chamber, a first intake valve that controls fluid flow through the intake valve assembly between the accumulation chamber and the fluid transport chamber, and a second intake valve that controls fluid flow through the intake valve assembly between the accumulation chamber and the second working chamber;
    a first control valve externally mounted to the outer tube, the first control valve having a first control valve inlet that is arranged in fluid communication with the fluid transport chamber and a first control valve outlet that is arranged in fluid communication with the collector chamber; and
    a second control valve externally mounted to the outer tube, the second control valve having a second control valve inlet that is arranged in fluid communication with the first intermediate chamber and a second control valve outlet that is arranged in fluid communication with the collector chamber.

2. The damper of claim 1, wherein the intake valve assembly includes a first intake valve body adjacent the second inner tube end and a second intake valve body that is longitudinally spaced from the first intake valve body, the first and second intake valve bodies abutting an inside cylindrical surface of the outer tube.

3. The damper of claim 2, wherein the intake valve assembly includes an indexing disc and a second intermediate chamber, wherein the first intermediate chamber is positioned longitudinally between the indexing disc and at least part of the second intake valve body, and wherein the second intermediate chamber is positioned longitudinally between the indexing disc and at least part of the first intake valve body.

4. The damper of claim 3, wherein the indexing disc includes a first intake opening that is open to the first intermediate chamber and a second intake opening that is open to the second intermediate chamber, wherein the first intake valve body includes a first intake passage extending between the second working chamber and the first intake opening in the indexing disc, wherein the first intake valve body includes a first intake orifice extending between the second intermediate chamber and the fluid transport chamber, wherein the second intake valve body includes a second intake passage extending between the accumulation chamber and the second intake opening in the indexing disc, and wherein the second intake valve body includes a second intake orifice extending between the accumulation chamber and the first intermediate chamber.

5. The damper of claim 4, wherein the first intake valve is a one-way valve that allows fluid flow in only one direction through the first intake orifice from the second intermediate chamber to the fluid transport chamber and wherein the second intake valve is a one-way valve that allows fluid flow in only one direction through the second intake orifice from the accumulation chamber to the first intermediate chamber.

6. The damper of claim 1, further comprising:
    a piston rod, connected to the piston, that extends longitudinally through a rod guide housed inside the outer tube.

7. The damper of claim 6, wherein the piston rod extends along a longitudinal axis, the first control valve includes a first valve member that is moveable along a first control valve axis between open and closed positions, the second control valve includes a second valve member that is moveable along a second control valve axis between open and closed positions, and the first and second control valve axes are parallel to one another and perpendicular to the longitudinal axis of the piston rod.

8. The damper of claim 6, wherein the rod guide includes a rod guide passage arranged in fluid communication with and extending between the first working chamber and the fluid transport chamber.

9. The damper of claim 1, wherein the intake valve assembly includes an intake valve body adjacent the second inner tube end that abuts an inside cylindrical surface of the outer tube and the second working chamber, the first intermediate chamber extending through the intake valve body between the accumulation chamber and the second working chamber, and a second intermediate chamber extending through the intake valve body between the accumulation chamber and the fluid transport chamber.

10. The damper of claim 9, wherein the first and second intake valves are poppets positioned in the first and second intermediate chambers respectively, the first and second intake valves being spring biased to a closed position.

11. The damper of claim 1, wherein the collector chamber has a limited circumferential extent that extends about the outer tube in an arc that is less than or equal to 180 degrees.

12. The damper of claim 1, wherein the outer tube has an outer tube length that is measured longitudinally between first and second outer tube ends, wherein the collector chamber has a collector chamber length that is measured longitudinally between first and second collector ends, and wherein the collector chamber length is shorter than the outer tube length.

13. The damper of claim 1, wherein the first intake valve is a one-way valve that permits fluid flow in only one direction from the accumulation chamber to the fluid transport chamber in response to movement of the piston towards the intake valve assembly.

14. The damper of claim 1, wherein the second intake valve is a one-way valve that permits fluid flow in only one direction from the accumulation chamber to the first intermediate chamber in response to movement of the piston away from the intake valve assembly.

15. The damper of claim 1, wherein the piston is free of orifices or passages such that there is no fluid flow through the piston.

16. A damper comprising:
an inner tube extending longitudinally between a first inner tube end and a second inner tube end;
a piston slidably disposed within the inner tube;
a first working chamber defined within the inner tube between the piston and the first inner tube end;
a second working chamber defined within the inner tube between the piston and the second inner tube end;
an outer tube disposed around the inner tube, the outer tube extending longitudinally between a first outer tube end and a second outer tube end, the first working chamber arranged in fluid communication with a fluid transport chamber disposed between the inner tube and the outer tube;
a collector chamber positioned outside of the outer tube;
an intake valve assembly positioned at the second inner tube end that abuts the outer tube to define an accumulation chamber between the intake valve assembly and the second outer tube end, the accumulation chamber arranged in fluid communication with the collector chamber, the intake valve assembly including a first intermediate chamber disposed in fluid communication with the accumulation chamber and the second working chamber, a second intermediate chamber disposed in fluid communication with the accumulation chamber and the fluid transport chamber, a first intake valve that controls fluid flow through the intake valve assembly between the accumulation chamber and the fluid transport chamber, and a second intake valve that controls fluid flow through intake valve assembly between the accumulation chamber and the second working chamber;
a first control valve externally mounted to the outer tube, the first control valve having a first control valve inlet that is arranged in fluid communication with the fluid transport chamber and a first control valve outlet that is arranged in fluid communication with the collector chamber;
a second control valve externally mounted to the outer tube, the second control valve having a second control valve inlet that is arranged in fluid communication with the first intermediate chamber and a second control valve outlet that is arranged in fluid communication with the collector chamber;
a floating piston slidably disposed in the outer tube between the intake valve assembly and the second outer tube end, wherein the accumulation chamber is positioned longitudinally between the intake valve assembly and the floating piston; and
a pressurized chamber positioned longitudinally between the floating piston and the second outer tube end, the pressurized chamber containing a pressurized fluid that operates to bias the floating piston towards the intake valve assembly.

17. The damper of claim 16, wherein the outer tube includes a first port arranged in fluid communication with and extending between the fluid transport chamber and the first control valve inlet, wherein the outer tube includes a second port arranged in fluid communication with and extending between the first intermediate chamber and the second control valve inlet, and wherein the outer tube includes a third port arranged in fluid communication with and extending between the collector chamber and the accumulation chamber.

18. A damper comprising:
an inner tube extending longitudinally between a first inner tube end and a second inner tube end;
a piston slidably disposed within the inner tube;
a first working chamber defined within the inner tube between the piston and the first inner tube end;
a second working chamber defined within the inner tube between the piston and the second inner tube end;
an outer tube disposed around the inner tube, the outer tube extending longitudinally between a first outer tube end and a second outer tube end, the first working chamber arranged in fluid communication with a fluid transport chamber disposed between the inner tube and the outer tube;
an intermediate tube disposed radially between the inner tube and the outer tube, the intermediate tube extending longitudinally between a first intermediate tube end that abuts the first inner tube end and a second intermediate tube end that abuts an inside cylindrical surface of the outer tube such that a reserve chamber is defined between the intermediate tube and the outer tube and such that the first working chamber is arranged in fluid communication with a fluid transport chamber disposed between the intermediate tube and the inner tube;
a collector chamber positioned outside of the outer tube;
an intake valve assembly positioned at the second inner tube end that abuts the outer tube to define an accumulation chamber between the intake valve assembly and the second outer tube end, the accumulation chamber arranged in fluid communication with the collector chamber, the intake valve assembly including a first intermediate chamber disposed in fluid communication with the accumulation chamber and the second working chamber, a second intermediate chamber disposed in fluid communication with the accumulation chamber and the fluid transport chamber, a first intake valve that controls fluid flow through the intake valve assembly between the accumulation chamber and the fluid transport chamber, and a second intake valve that controls fluid flow through the intake valve assembly between the accumulation chamber and the second working chamber;

a first control valve externally mounted to the outer tube, the first control valve having a first control valve inlet that is arranged in fluid communication with the fluid transport chamber and a first control valve outlet that is arranged in fluid communication with the collector chamber; and a second control valve externally mounted to the outer tube, the second control valve having a second control valve inlet that is arranged in fluid communication with the first intermediate chamber and a second control valve outlet that is arranged in fluid communication with the collector chamber.

19. The damper of claim 18, wherein the outer tube includes a first port arranged in fluid communication with and extending between the fluid transport chamber and the first control valve inlet, wherein the outer tube includes a second port arranged in fluid communication with and extending between the first intermediate chamber and the second control valve inlet, wherein the outer tube includes a third port arranged in fluid communication with and extending between the collector chamber and the accumulation chamber, and wherein the outer tube includes a fourth port arranged in fluid communication with and extending between the collector chamber and the reserve chamber.

20. The damper of claim 18, wherein the intermediate tube includes at least one helical rib that extends helically about an outside surface of the intermediate tube and outwardly towards the outer tube.

* * * * *